US 6,743,546 B1

(12) United States Patent
Kaneda et al.

(10) Patent No.: US 6,743,546 B1
(45) Date of Patent: Jun. 1, 2004

(54) LAMINATE SHEATH TYPE BATTERY

(75) Inventors: Masaaki Kaneda, Osaka (JP); Hideaki Yoshio, Osaka (JP); Yoshitaka Matsumasa, Wakayama (JP); Hiroaki Ichinose, Osaka (JP); Hitoshi Suzuki, Osaka (JP); Shingo Tsuda, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/937,554

(22) PCT Filed: Mar. 27, 2000

(86) PCT No.: PCT/JP00/01873
§ 371 (c)(1),
(2), (4) Date: Sep. 26, 2001

(87) PCT Pub. No.: WO00/59063
PCT Pub. Date: Oct. 5, 2000

(30) Foreign Application Priority Data

Mar. 26, 1999 (JP) .......................... 11/082851
Mar. 26, 1999 (JP) .......................... 11/083339
Mar. 31, 1999 (JP) .......................... 11/092576
Dec. 20, 1999 (JP) .......................... 11/361192

(51) Int. Cl.⁷ ...................... H01M 6/04; H01M 2/24
(52) U.S. Cl. .................. 429/127; 429/129; 429/130; 429/136; 429/138; 429/139; 429/146; 429/152; 429/153; 429/162; 429/163; 429/177; 429/179; 429/180; 429/184

(58) Field of Search ................. 429/123, 127, 429/129, 130, 136, 138, 139, 146, 152, 153, 162, 163, 177, 179, 180, 184

(56) References Cited

U.S. PATENT DOCUMENTS 5,510,203 A * 4/1996 Hamada et al. ............... 429/53
6,387,567 B1 * 5/2002 Noh ........................... 429/211

FOREIGN PATENT DOCUMENTS

| EP | 845821 | 6/1998 |
| EP | 862227 | 9/1998 |
| JP | 10-261427 | 9/1998 |
| JP | 10-261428 | 9/1998 |
| JP | 11-67281 | 3/1999 |
| JP | 11-288698 | 10/1999 |
| JP | 2000-123801 | 4/2000 |

* cited by examiner

*Primary Examiner*—Bruce F. Bell
(74) *Attorney, Agent, or Firm*—Jordan and Hamburg LLP

(57) ABSTRACT

Battery with a flexible laminate casing includes a means for fixing the electrode assembly (2) within the casing (1, 18). The fixing means may be a frame (19, 33, 38, 50, 54) attached to the periphery of the electrode assembly, or an insulating spacer (59, 69, 70, 77, 78) encased within the casing together with the electrode assembly such as to fill a space between one end of the electrode assembly and the casing. Alternatively, the fixing means may be constructed of a material with which the casing and the electrode assembly are joined together by applying heat and pressure, or may be an abutting surface (87h) provided to the casing (87) itself such as to make contact with one end face of the electrode assembly within the casing.

50 Claims, 25 Drawing Sheets

LAMINATE SHEATH TYPE BATTERY

TECHNICAL FIELD

The present invention relates to a thin battery with a laminate casing, wherein the electricity generating elements are packaged in a casing which is formed by superposing two sheets of laminate and joining the periphery thereof.

BACKGROUND ART

Thin, lightweight non-aqueous electrolytic batteries with flexible laminate casing such as lithium polymer rechargeable battery are most suitable for use as the drive power sources of thin, portable electronic devices, and particularly of portable telephones that have become so popular in recent years.

FIG. 35 is a plan view showing a lithium polymer rechargeable battery as one example of a prior art battery with a laminate casing. FIG. 36 is a cross-sectional view seen along the line XXXVI—XXXVI of FIG. 35. As shown in FIG. 36, a plurality of electrode plate modules 3 are stacked up to form a stacked electrode assembly 2, which is accommodated in a casing 1 made of a laminate sheet. Because of such flatness, the stacked electrode assembly 2, being enveloped in a laminate sheet casing 1, is advantageously used for constructing a flat and lightweight battery.

Referring to FIG. 37, the electrode plate module 3 includes a negative electrode plate 4 composed of a negative electrode current collector 7 and negative electrode mixture layers 8 formed on both sides thereof, a pair of positive electrode plates 9 composed of a positive electrode current collector 10 and positive electrode mixture layers 11 formed on both sides thereof. The positive electrode plates 9 are superposed on both sides of the negative electrode plates 4 with intervening separators 12 therebetween to form an integral unit of electrode plates. These electrode plate modules 3 are stacked upon one another to form the electrode assembly 2 shown in FIG. 36 and to attain a required voltage or battery capacity. Negative electrode terminals 7a extend from one end of each of the negative electrode current collectors 7, and these negative electrode terminals 7a are bundled and welded together, with a negative electrode lead 13 welded to the weld joint. Similarly, positive electrode terminals 10a shown in FIG. 37 which extend from one end of each of the positive electrode current collectors 10 are bundled together, and a positive electrode lead 14 shown in FIG. 35 is welded to the weld joints of the positive electrode terminals.

The casing 1 consists of a laminate sheet, including a metal layer such as an aluminum foil for providing air-tight and liquid-tight properties, with a resin layer having a high melting point bonded to an outer side of the metal layer, and another resin layer of metamorphic polypropylene bonded to an inner side of the metal layer. The laminate sheet is folded in two as shown in FIG. 38, and formed into an envelope shape by heat-sealing the opposite edges P1, P2. The stacked electrode assembly 2 is inserted into the casing 1 through the open end, liquid electrolyte is injected thereinto, and the open end edge P3 is heat-sealed such that the positive electrode lead 14 and the negative electrode lead 13 extend to the outside as shown in FIG. 35.

Japanese Laid-open Patent Application No. 11-288698 proposes bonding of an additional resin seat or a sealing material 17, by applying heat, to both sides of the positive electrode lead 14 and the negative electrode lead 13 where they pass through the open end edge P3, so that the portions of the open end edge P3 where the positive electrode lead 14 and the negative electrode lead 13 pass through are reinforced with the additional resin sheet 17 to have enhanced leakage-proof property. For the resin sheet 17, a copolymer of ionomer, ethylene and acrylic acid, polyethylene resin, polypropylene resin, polyamide resin, polyester resin or polyurethane resin are used.

Another conventional battery employs a casing 18 having a construction shown in FIG. 39. The casing 18 made of a laminate sheet similar to the one mentioned above includes a base part 18a, which is one side of the folded laminate sheet, the other side thereof forming a cover 18b. The base part 18a has a recess 18b for accommodating the stacked electrode assembly 2 therein. One advantage of this casing 18 is that, as compared to the envelop-shaped casing 1, the electrode assembly 2 can readily be inserted into the recess 18b of the base part 18a, with the cover 18c being widely opened.

The casing 18 has seal flanges 18d, 18e, and 18f, and when the stacked electrode assembly 2 is accommodated within the recess 18b, the positive electrode lead 14 and the negative electrode lead 13 sit on the seal flange 18e and extend to the outside of the base part 18a. The cover 18c is then closed, with its two opposite sides being heat-sealed with the seal flanges 18d, 18f, and liquid electrolyte is injected into the casing through the openings between the remaining seal flange 18e and one end edge of the cover 18c. Thereafter, the seal flange 18e and the end edge of the cover 18c is welded to seal the casing 18.

Similarly to the envelop type casing 1, a resin sheet 17 made of polypropylene film is joined to the positive electrode lead 14 and the negative electrode lead 13 from both sides where they pass through the seal flange 18e end, so that the sealing property at this end will not be deteriorated and reliable leakage-proof property is ensured. One side of the recess 18b, at which the positive electrode lead 14 and the negative electrode lead 13 extend to the outside, has an inclined surface 18g, so as to accommodate the negative electrode terminals 7a and positive electrode terminals 10a, which take a triangular shape as they are bundled together at a location near the seal flange 18e.

In neither of the above-described batteries using either the casing 1 or 18, the stacked electrode assembly 2 inside is not sufficiently retained in position, because it is accommodated within the casing made of a flexible laminate sheet with a certain gap provided in the direction parallel with the direction of the two extending leads 13, 14. As a result, continuous vibration transmitted from the portable electronic equipment in which the battery is installed may cause the stacked electrode assembly 2 to displace within the casing 1 or 18, resulting in offsetting of the stacked electrode plate modules 3.

Displacement of the stacked electrode assembly 2 or offsetting of the stacked electrode plates 3 give rise to various problems. For example, the joints between the negative and positive electrode leads 13, 14 and their respective terminals 7a, 10a, and the joints between the leads and the casing 1, 18, which are mechanically weak, may be subjected to repeated bending, resulting in deformation or disconnection in these portions. The casing 1, 18 is also constantly subjected to the risk of being damaged by pointed edges or burrs on the electrode assembly 2. Also, the intermediate metal layer of the laminate sheet casing 1, 18 may contact the electrode assembly 2, whereby a local cell is formed due to the intervening electrolyte, resulting in development of gas, or short-circuiting across electrodes 9, 4 or terminals 7a, 10a of opposite polarity. These troubles may lead to malfunctioning of battery output, electrolyte leakage, or corrosion of the metal layer in the laminate sheet casing caused by the electrolyte.

All of these troubles result from the structure wherein the electrode assembly 2 is not retained in position within the casing 1, 18. The electrode assembly 2, in its widthwise direction which is orthogonal to the direction along the leads 13, 14, snugly fits in the casing 1, 18, because there are no leads in this direction. However, when welding the resin sheet 17 to the casing 1, 18 with an automatic welder, welding points are spaced from the negative and positive electrode terminals 7a, 10a, in order to achieve reliable welding by positively preventing occurrence of bad welds caused by contact of the welding member with the negative electrode terminals 7a or positive electrode terminals 10a. Thus a gap inevitably exists between the electrode assembly 2 and the casing 1, 18 in the direction along the leads 13, 14.

Portable phones, in particular, in which such battery with laminate casing is used commonly, are carried about in the pockets of clothing or in brief cases, so that batteries are frequently subjected to vibration and even considerable impacts upon the device being dropped. Portable telephones thus have a disadvantage that battery breakage or electrolyte leakage occurs frequently.

One of the conventional countermeasures to prevent these troubles is to provide a band stretching over both ends of the electrode plate group 2 in order to prevent the offsetting of the positive and negative electrode plates 9, 4 upon being subjected to vibration or impact. However, such band merely restrains the electrode plates and cannot prevent deformation of the leads 13, 14 or their weld joints which may be caused by the impact. Thus there remains the risk of internal short-circuiting across the terminals 10a, 7a of opposite polarity.

It has also been proposed to fix the plurality of terminals 10a, 7a of the same polarity in mutually spaced relationship with a conductive adhesive, when constructing the electrode assembly 2. This gives allowance for slight offsetting or displacement of the terminals 10a, 7a of opposite polarity with respect to each other during the assembling step of the electrode assembly 2. Nevertheless, it is not sufficient to prevent offsetting or displacement of the electrode plate modules 3 within the casing 1, 18 caused by vibration or impact, and there remains the risk of internal short-circuiting across the terminals 10a, 7a of opposite polarity caused by crushed or deformed leads 13, 14 or their weld joints.

The present invention is directed to solve the problems pointed out above, and therefore, an object of the invention is to provide a battery with laminate casing which can withstand repeated vibration or large impact, whereby the possibility of occurrence of output failure, electrolyte leakage, or corrosion of the casing is remarkably reduced.

DISCLOSURE OF THE INVENTION

To achieve the object, the present invention provides a battery including:

liquid electrolyte and an electrode assembly, both accommodated within a sealed casing made of a laminate sheet, the electrode assembly including a plurality of positive electrode plates and a plurality of negative electrode plates stacked upon one another with a plurality of intervening separators therebetween, the positive electrode plates having respective positive electrode terminals and a positive electrode lead joined to the positive electrode terminals, and the negative electrode plates having respective negative electrode terminals and a negative electrode lead joined to the negative electrode terminals, these positive electrode lead and negative electrode lead being extended to the outside through one end of the casing; and a means for fixing the electrode assembly in position within the casing.

According to this battery, the electrode assembly inside the battery is fixed in position even if the portable electronic device in which the battery is mounted is subjected to frequent or repeated vibration or large shock. Therefore, there is no risk in this battery that the positive and negative electrode leads joined to their respective electrode plates are bent or cut, or that the flexible laminate casing is damaged by pointed corners or burrs on the electrode assembly. Accordingly, various troubles, such as short-circuiting across the intermediate metal layer of the casing and the electrode assembly, battery output failure, leakage of electrolyte, and corrosion of the metal layer in the casing by the electrolyte, are all prevented.

The electrode assembly fixing means may be constructed of a frame surrounding the periphery of the electrode assembly and accommodated within the casing with the electrode assembly. According to one aspect of the invention, the frame includes a rectangular frame portion surrounding the periphery of the electrode assembly, a pair of protective pieces projecting outwards from opposite side edges of one end of the frame portion to cover joints between the positive and negative electrode terminals and the positive and negative electrode leads from both sides, the frame portion having through holes along one side thereof for allowing the positive and negative electrode terminals to extend to the outside.

Thereby, the joints between the positive and negative electrode terminals and their leads, which are mechanically weak, are protected against impacts as they are arranged within the space enclosed by the pair of protective pieces, and are prevented from being deformed or disconnected. Also, when sealing the casing in the assembling step, there is no risk that the welding tool of an automatic welder may contact the positive or negative electrode terminals. Therefore, the casing can be sealed at a nearest possible position to the distal ends of the pair of protective pieces. As a result, the frame is enclosed in the casing without any free space therein, and the electrode assembly surrounded by the frame is reliably fixed within the casing even in a condition with repeated vibration or large shocks.

According to another aspect of the invention, the frame includes a first part consisting of a first half frame and a second part consisting of a second half frame for holding the periphery of the electrode assembly from both sides, the first half frame and the second half frame being integral with each other via a bendable hinge and superposed upon one another, and respectively having a protective piece extending outwards from one end thereof opposite from the hinge, and one of the first half frame and the second half frame having notches therein for passing through the positive and negative electrode terminals to the outside.

The frame is one piece but can simply be attached to the electrode assembly such as to surround the periphery thereof by bending the frame into two by means of the hinge. The cut-outs provided to one of the half frames form through holes when closed by the side edge of other half frame, so as to allow the positive and negative electrode terminals to extend to the outside while fixed in position.

Preferably, the first and the second half frames have engagement pieces for making locking engagement with each other on one end thereof opposite from the hinge, so as to securely attach the frame to the electrode assembly.

Preferably, the protective pieces of the first and the second half frames come to face each other with a space formed therebetween and are connected via a connector when the first and the second half frames are superposed upon one another via the hinge. Thereby the rigidity of the protective pieces is enhanced and the space formed therein is hardly deformable. Thus the joints between the electrode terminals and their leads are reliably protected from shocks and the electrode assembly is even more securely held in position.

According to yet another aspect of the invention, the frame includes a first part consisting of a first half frame and a second part consisting of a second half frame for holding the periphery of the electrode assembly from both sides, the first half frame and the second half frame being separate from each other and respectively having a protective piece extending outwards from one end thereof, and engagement pieces along more than one side thereof for making locking engagement with each other to couple the first and the second parts when superposed, and one of the first half frame and the second half frame having notches therein for passing through the positive and negative electrode terminals to the outside. In addition to the electrode assembly protection effect and position displacement prevention effect, this construction enables easier fabrication of the frame.

According to a further aspect of the invention, the electrode assembly fixing means is a frame surrounding the periphery of the electrode assembly and accommodated within the casing with the electrode assembly. The frame includes an abutment portion making contact with one end face of the electrode assembly from which the positive and negative electrode terminals extend, the abutment portion being formed with through holes for passing through the positive and negative electrode terminals, a pair of legs extending from both ends of the abutment portion to cover both side faces of the electrode assembly, and a pair of protective pieces extending from opposite side edges of the abutment portion in a direction opposite from the pair of legs so as to cover joints between the positive and negative electrode terminals and their respective leads from both sides.

Thereby, the joints between the positive and negative electrode terminals and their leads, which are mechanically weak, are protected against impacts as they are arranged within the space enclosed by the pair of protective pieces, and are prevented from being deformed or disconnected. The frame covers at least one end face and both side faces of the rectangular electrode assembly within the casing, protects the casing from being damaged by pointed corners or burrs on the electrode assembly, and prevents short-circuiting across the electrode assembly and the metal layer in the casing made of laminate sheet. Further, the frame can be attached to the electrode assembly by simply spreading the pair of legs, causing the abutment portion to warp, and inserting the electrode assembly between the pair of legs of the frame, with the electrode terminals being passed through the through holes. The frame has a more simplified construction covering only three sides of the electrode assembly, resulting in a decrease in material cost.

Preferably, the pair of protective pieces have a length extending to a portion near a joint between the positive and the negative electrode leads and the casing. Thereby, the casing can be sealed at a nearest possible position to the distal ends of the pair of protective pieces. As a result, the frame is enclosed in the casing without any free space therein, and the electrode assembly surrounded by the frame is reliably fixed within the casing even in a condition with repeated vibration or large shocks.

Preferably, the pair of protective pieces have resiliency so as to bend inwards when pressed by the laminate sheet forming the casing which is superposed and joined together at its periphery. Thereby, when the sheets of flexible laminate of the casing are superposed and joined, the pair of protective pieces are pressed to deform toward each other, forming a space therein which conforms to the shape of the bundles of electrode terminals having a substantially triangular cross-section. Thus the rigidity of the protective pieces is enhanced, ensuring that joints between the electrode terminals and leads are reliably prevented from damage or deformation.

Alternatively, the frame may include a cover integral with the frame extending from opposite side edges of the abutment portion in a direction opposite from the pair of legs so as to form a space therein having a triangular cross-section so as to accommodate the joints between the positive and negative electrode terminals and their respective leads within the space, the cover including through holes for passing through the positive and negative electrode terminals. The cover integral with the frame forms a space therein which has a triangular cross-section and is higher in rigidity than a pair of protective pieces. Thus it is ensured that the joints between the electrode terminals and leads are reliably protected from vibration or shocks and prevented from damage and deformation. Since the cover has an inclined surface on its inner side, it also offers the advantage that, during the assembly of the battery, the electrode terminals can be smoothly guided into the through holes along this inclined surface.

Preferably, the pair of legs has a U-shaped cross-section so as to fit onto the side edges of the electrode assembly, so as to reliably prevent offsetting of the plurality of stacked electrode plate modules of the electrode assembly even if subjected to large shocks or repeated vibration.

Alternatively, the frame may further include a pair of support frames integrally formed with the pair of legs, the support frames extending respectively from the distal ends of the legs inwards so as to cover the two corners of the electrode assembly at the end opposite from the end where the positive and negative electrode terminals extend. With this construction, while the frame can readily be attached to the electrode assembly, the two corners on one end of the electrode assembly opposite from the electrode terminals are securely accommodated within the support frames, i.e., while the construction is simplified, the frame substantially surrounds the periphery of the electrode assembly. Thus the offsetting of the plurality of stacked electrode plate modules of the electrode assembly is reliably prevented.

Alternatively, the frame may include a pair of connector plates for closing the distal ends of the pair of legs so as to cover the two corners of the electrode assembly at the end opposite from the end where the positive and negative electrode terminals extend. The construction of this frame and attachment thereof to the electrode assembly are further simplified as compared to the one described above with the pair of support frames, yet it offers the same advantages as mentioned above.

According to another aspect of the invention, the electrode assembly fixing means is an insulating spacer abutted on one end face of the rectangular electrode assembly where the positive and negative electrode terminals extend, and an adhesive tape for fixing the insulating spacer to the electrode assembly, the insulating spacer including a bottom abutting on one end face of the electrode assembly except for the positive and negative electrode terminals, a pair of side walls standing upright from both side edges of the bottom to a height for covering joints between the positive and negative electrode terminals and the positive and negative electrode leads, the bottom and the side walls being formed in one piece, and the adhesive tape being stuck over to the electrode assembly and the insulating spacer so as to cover four corners at one end of the electrode assembly.

This fixing means is composed of an insulating spacer which is further simplified as compared to the various frames described above, and therefore is lower in material cost. The insulating spacer, with its bottom abutted on one end face of the electrode assembly, is fixed to the electrode assembly with the adhesive tape, whereby the plurality of stacked electrode plate modules of the electrode assembly are restricted from offsetting even if the battery is subjected to vibration or shocks. The pair of side walls cover the mechanically weak joints between the electrode terminals and leads from both sides and protect same from shocks. Also, the side walls fill up the space between the casing and one end face of the electrode assembly where the electrode terminals extend, whereby, while it is simply constructed, it effectively restricts free movement of the electrode assembly when the battery is subjected to vibration or shocks. Furthermore, the insulating spacer is particularly effective for preventing the electrode terminals or pointed corners of the electrode assembly from contacting the inner resin layer of the flexible laminate casing, and it ensures prevention of damages to the casing.

Alternatively, an additional adhesive tape may be stuck to the opposite end of the electrode assembly so as to cover the four corners thereof. By covering all corners of the electrode assembly with adhesive tape, the flexible laminate casing is prevented from being damaged by pointed corners of the electrode assembly, even if it moves because of vibration or shocks.

In one aspect of the invention, the electrode assembly includes a plurality of stacked electrode plate modules, each of the electrode plate modules including a negative electrode plate, a pair of positive electrode plates superposed on both sides of the negative electrode plate with intervening separators therebetween, and positive electrode terminals respectively extending from the pair of positive electrode plates. In this construction, it is preferable that the positive electrode terminals be provided with an insulative coating at least on one side thereof facing an adjacent electrode plate module. Thereby, even if the negative electrode plates are formed larger than the positive electrode plates because of dimensional errors, and even if the electrode plates are offset from each other because of vibration or shocks, the insulative coating will prevent short-circuiting across both electrode plates.

According to yet another aspect of the present invention, the electrode assembly fixing means is an insulating spacer abutted on one end face of the rectangular electrode assembly where the positive and negative electrode terminals extend, and strips of adhesive tapes for fixing the insulating spacer to the electrode assembly, the insulating spacer including a bottom abutting on one end face of the electrode assembly except for the positive and negative electrode terminals, a pair of side walls standing upright from both side edges of the bottom to a height for covering joints between the positive and negative electrode terminals and the positive and negative electrode leads, the bottom and the side walls being formed in one piece, and the strips of adhesive tapes having a length for covering opposite side edges of the electrode assembly along the length thereof.

With this construction, the battery is low in material cost because of the more simplified insulating spacer, while it ensures that each of the stacked electrode plate modules is restricted from displacing, and the electrode assembly itself is fixed in position even when the battery receives vibration or shocks, thereby protecting the joints between the electrode terminals and leads from shocks. In addition, since all corners of the electrode assembly are covered by the adhesive tapes, the inner resin layer of the flexible laminate casing is prevented from being damaged by pointed corners or edges of the electrode assembly, even if it moves because of vibration or shocks.

In cases where a pair of adhesive tapes are employed as described above, it is preferable to trim one end face and both side end faces of the electrode assembly to have flat surfaces. This is particularly so when the laminate sheet casing has the configuration wherein it has a recess in which the electrode assembly is fixedly fitted, because in such case it is desirable to cover the sharpened edges of the electrode assembly to protect the inner resin layer of the laminate sheet casing.

According to a further aspect of the present invention, the electrode assembly fixing means is an insulating spacer made of a material resistant to the electrolyte and having a higher melting point than that of the casing, and accommodated within the casing together with the electrode assembly, the insulating spacer having a shape corresponding to a space defined by one end face of the electrode assembly where the positive and negative electrode terminals extend, and an inner surface of the casing opposite the end face of the electrode assembly, and including a pair of through holes for passing through the positive and negative electrode leads respectively joined to the positive and negative electrode terminals to the outside, and a reinforcing portion provided between the through holes such as to make tight contact with the one end face of the electrode assembly.

With this construction, before inserting the electrode assembly into the casing, the positive and negative electrode leads are passed through the pair of through holes in the insulating spacer, and the spacer is attached to one end of the electrode assembly. After inserting the electrode assembly into the casing, the casing is sealed by applying heat and pressure. Here, since the insulating spacer has a higher melting point than the casing, the laminate sheet casing can be sealed at a nearest possible position to the insulating spacer. The insulating spacer is packed within the casing with it s reinforcing portion tightly contacted to one end of the electrode assembly, filling the space between the electrode assembly and the casing. Thus the electrode assembly is securely held in position within the casing. Also, this insulating spacer is a simply constructed one-piece product, whereby a reduction in material cost and the number of assembling steps is achieved.

For such insulating spacer, a flat plate member may be used which is bent along at least two grooves into the shape corresponding to the space defined by one end face of the electrode assembly and the inner surface of the casing opposite the end face of the electrode assembly.

As compared to the one-piece spacer, the flat plate member can be fabricated at a lower cost and assembled simply by bending, while offering the same advantages as those of the one-piece product.

Preferably, the insulating spacer and the casing are joined together by applying heat and pressure. By joining the casing with the insulating spacer which has high rigidity and is fixed to the electrode assembly, the electrode assembly is fixed within the casing even more reliably.

Preferably, the positive and negative electrode leads are respectively provided with folded-back portions inside the insulating spacer near a point where the positive and negative electrode terminals are joined thereto. Thereby, even if the positive or negative electrode leads are subjected to tension from the outside, such can be absorbed by folded-back portions that serve as a spring. Thus, as compared to prior art battery of this type, the electrode leads of the battery of the invention can withstand a much larger external force.

According to yet another aspect of the invention, the electrode assembly fixing means is made of a pair of flat plate spacers made of a material resistant to the electrolyte and having resiliency, and accommodated within the casing together with the electrode assembly, the flat plate spacers being joined together such as to cover joints between the positive and negative electrode terminals of the electrode assembly as being deformed to conform to the contour of the joints, one end face of each of the flat plate spacers making contact with one end face of the electrode assembly where the positive and negative electrode terminals extend.

The pair of flat plate spacers joined together, when encased within the casing with the electrode assembly, do not allow any free movement of the electrode assembly. The flat plate spacers have resiliency and can deform to be joined together, covering the electrode terminals from both sides. Therefore, while it has a simple flat plate shape and is lower in material cost, it offers the same advantages as those of the above-described insulating spacer.

According to a further aspect of the invention, the electrode assembly fixing means is a metamorphic olefin resin provided at a plurality of locations between the casing and the electrode assembly accommodated therein, the casing and the electrode assembly being joined together through the metamorphic olefin resin by applying heat and pressure. This fixing means is simple and low-cost, and by directly adhering the electrode assembly to the casing, it prevents troubles such as battery output failure, electrolyte leakage, and corrosion of metal layer in the casing by the electrolyte. Also, even when the thickness or the shape of the electrode assembly is changed because of modification in the number or the size of the electrode plates, no special adjustment is needed for the fixing means in the assembling step.

According to a yet another aspect of the invention, the electrode assembly fixing means is a tape attached to the electrode assembly for maintaining the shape thereof, the casing and the electrode assembly being joined together through the tape by applying heat and pressure. This fixing means is simple and low-cost, as it utilizes existing fixing tape as an adhesive, and by directly adhering the electrode assembly to the casing via the tape, it prevents troubles such as battery output failure, electrolyte leakage, and corrosion of metal layer in the casing by the electrolyte. Also, even when the thickness or the shape of the electrode assembly is changed because of modification in the number or the size of the electrode plates, no special adjustment is needed for the fixing means in the assembling step.

According to a further aspect of the invention, the electrode assembly fixing means is composed of a pair of inclined surfaces formed in one side face of a recess formed in the casing for receiving the electrode assembly, and abutting surfaces provided between the inclined surfaces and on both outer sides thereof, for making tight contact with one end face of the electrode assembly accommodated in the recess, the positive and negative electrode terminals of the electrode assembly being respectively fitted onto the inclined surfaces.

Thereby, when the electrode assembly is inserted in the recess, the abutting surfaces make tight contact with one end face of the electrode assembly where the leads extend. Thus the electrode assembly is held in position within the recess, and troubles such as battery output failure, electrolyte leakage, and corrosion of metal layer in the casing are all prevented. Also, with this fixing means, the electrode assembly is fixed by just inserting same into the recess, and no fixing process step is required such as applying heat with a hot plate.

Alternatively, the separators may have larger outer dimensions than those of the positive electrode plates and the negative electrode plates, so that the separators project from both sides of the electrode assembly and prevent positive and negative electrode plates from contacting the laminate sheet casing.

In any aspects of the invention described above, the casing may be made of a laminate sheet bent in two and formed into a bag shape by joining the periphery thereof, or may be made of a laminate sheet bent in two, and having a base part forming a recess for receiving the electrode assembly and a cover for closing the recess.

It should be noted that all the effects and advantages of the present invention described above will also be achieved if the electrode assembly is constructed of positive and negative electrode plates wound into a coil with intervening separators therebetween and pressed into a flat shape, instead of the stacked electrode plates.

BEST MODE FOR CARRYING OUT THE INVENTION

Figure 36:
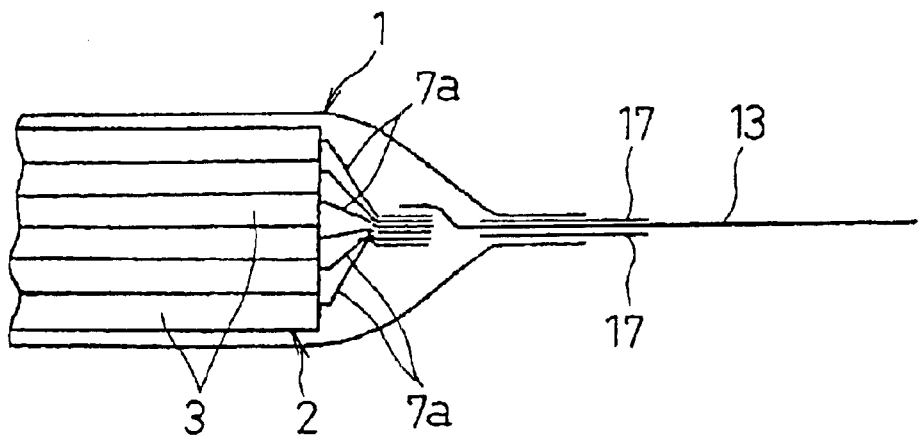
FIG. 36 is a cross-sectional view taken along the line XXXVI—XXXVI of FIG. 35.

Preferred embodiments of the present invention will be hereinafter described with reference to the accompanying drawings. The electrode plate modules 3, the stacked electrode assembly 2 constructed by stacking them, and the casing 1 or 18 in the various embodiments described below are substantially the same as those that have been described with reference to FIG. 35 through FIG. 40. The structure of the electrode plate modules 3 used for the battery with laminate casing according to the present invention has already been shown with reference to FIG. 37, but a supplementary description of the electrode plate modules 3 is given first with reference to FIG. 36 and FIG. 37. The various embodiments described below will be shown in the form of a lithium polymer rechargeable battery as one example, and therefore the electrode plate modules 3 are constructed of polymer electrolyte in the form of a sheet or a film to constitute a flat stacked electrode assembly 2.

The electrode plate module 3 includes a film- or sheet-like positive electrode plate 9 and negative electrode plate 4 laminated upon one another with an intervening separator 12. The positive electrode plate 9 is composed of a current collector 10 made of an aluminum foil formed with a large number of pores, and a positive electrode mixture layer 11 formed on both sides of the current collector 10, the mixture 11 containing active materials of a lithium compound and a copolymer for retaining the non-aqueous electrolyte, such as vinylidene fluoride-hexafluoropropylene (VdF-HFP). The negative electrode plate 4 is composed of a current collector 7 made of copper foil formed with a large number of pores, and a negative electrode mixture layer 8 formed on both sides of the current collector 7, the mixture 8 containing a carbonaceous material which can absorb and release lithium ions and the above-mentioned copolymer. The separator 12 is made of polymer film for holding the above-mentioned electrolyte.

(First Embodiment)

Figure 1:
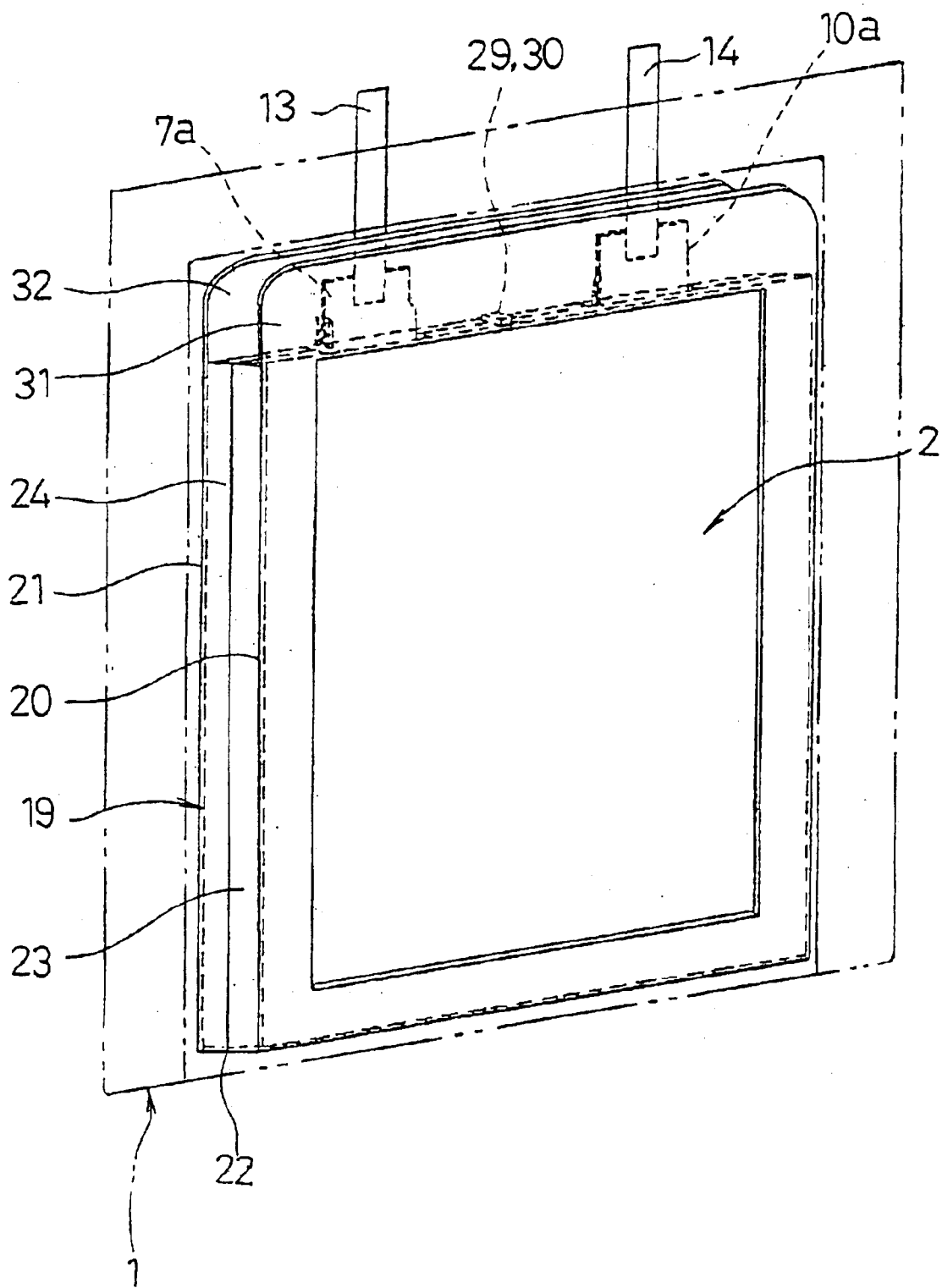
FIG. 1 is a perspective view illustrating a battery with a laminate casing according to a first embodiment of the present invention.

FIG. 1 is a perspective view illustrating a battery with laminate casing according to a first embodiment of the invention. Within a laminate casing 1 having a bag shape is enclosed a stacked electrode assembly 2 with a protective frame 19 attached to the peripheries of the electrode assembly 2 so as to protect same from vibration or impact. The frame 19 is formed in one piece and made of resin such as polypropylene.

Figure 2:
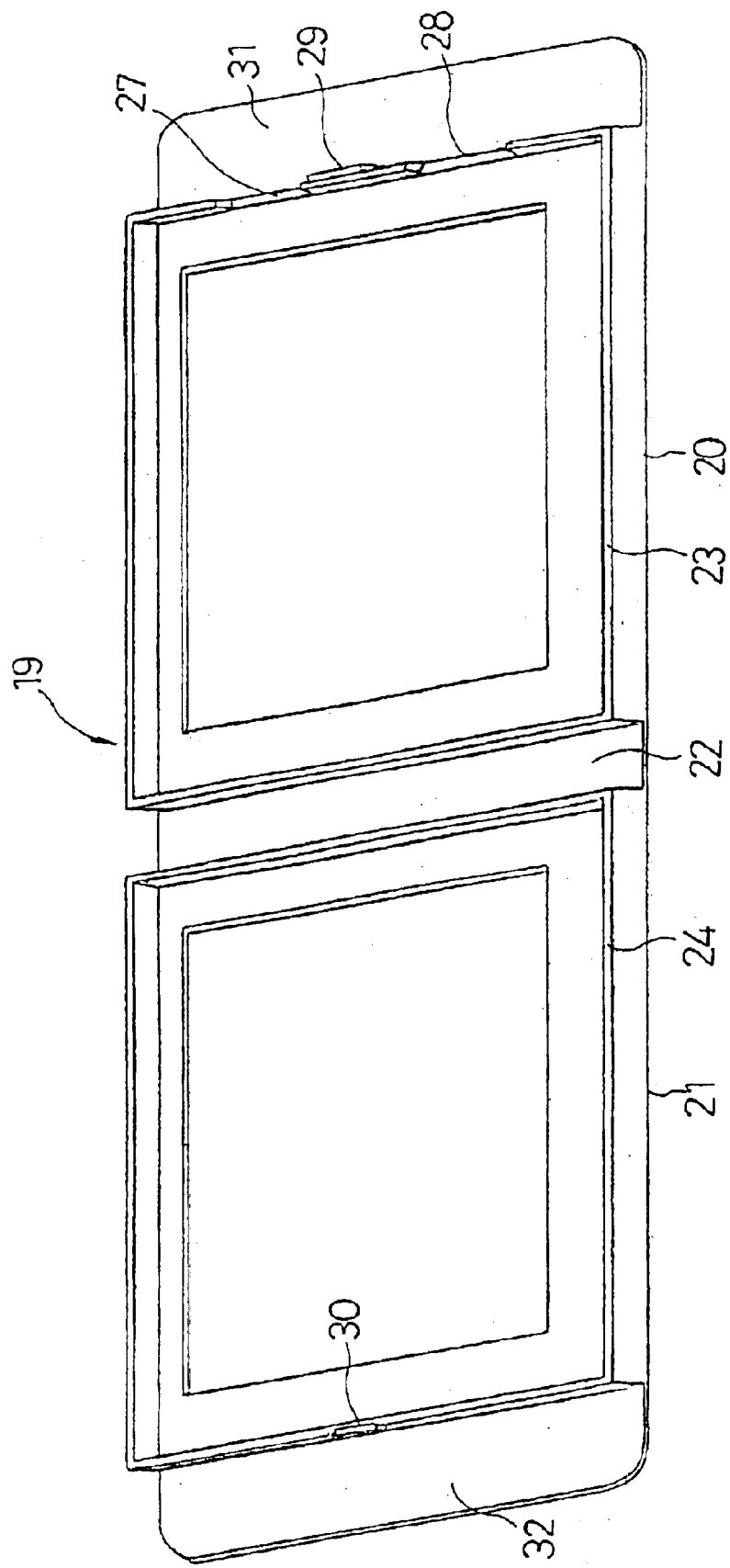
FIG. 2 is a perspective view of a frame for the battery in an opened-out condition.

The protective frame 19, when spread as shown in the perspective figure of FIG. 2, includes a first part 20 and a second part 21 connected to each other via a bendable portion which makes a hinge 22, so that the parts can be overlaid upon one another. First and second half frames 23, 24 are respectively formed on the first and second parts 20, 21, and these, when overlaid, form a cavity inside for tightly accommodating the stacked electrode assembly 2. On one edge of the first half frame 23 on the opposite side of the hinge 22 are a pair of notches 27, 28 for forming slots to pass through bundled positive and negative electrode terminals 10a, 7a, and a lock 29 between them. A corresponding lock 30 for engagement with the lock 29 is provided on one edge of the second half frame 24 on the opposite side of the hinge 22. One of the locks 29, 30 is a hook while the other is a hole for mutual engagement. Marginal edges integrally extend from opposite sides of the half frames 23, 24 to form protective pieces 31, 32.

The electrode assembly 2 is fitted onto the first part 20 of the frame 19, so that the lower half of the electrode assembly 2 is accommodated within the first half frame 23, with the positive and negative electrode terminals 10a and 7a being respectively fitted into the notches 27, 28. As the frame 19 is bendable because of the hinge 22, the second part 21 is overlaid upon the first part 20 and the two are united by means of the locks 29, 30. Thus the electrode assembly 2 snugly fits in the cavity formed inside the abutted half frames 23, 24. The positive and negative terminals 10a, 7a extend from the frame through apertures formed by the notches 27, 28 and one edge of the second half frame 24 in a fixedly retained condition. The protective pieces 31, 32 on both sides of the frame provide protection for the terminals 10a, 7a, and the leads 13, 14 joined thereto. As mentioned above, the frame 19 is formed in one piece and bendable due to the hinge 22 for allowing the two parts 20, 21 to be overlaid, whereby the electrode assembly 2 is readily encased in the frame 19.

Figure 38:
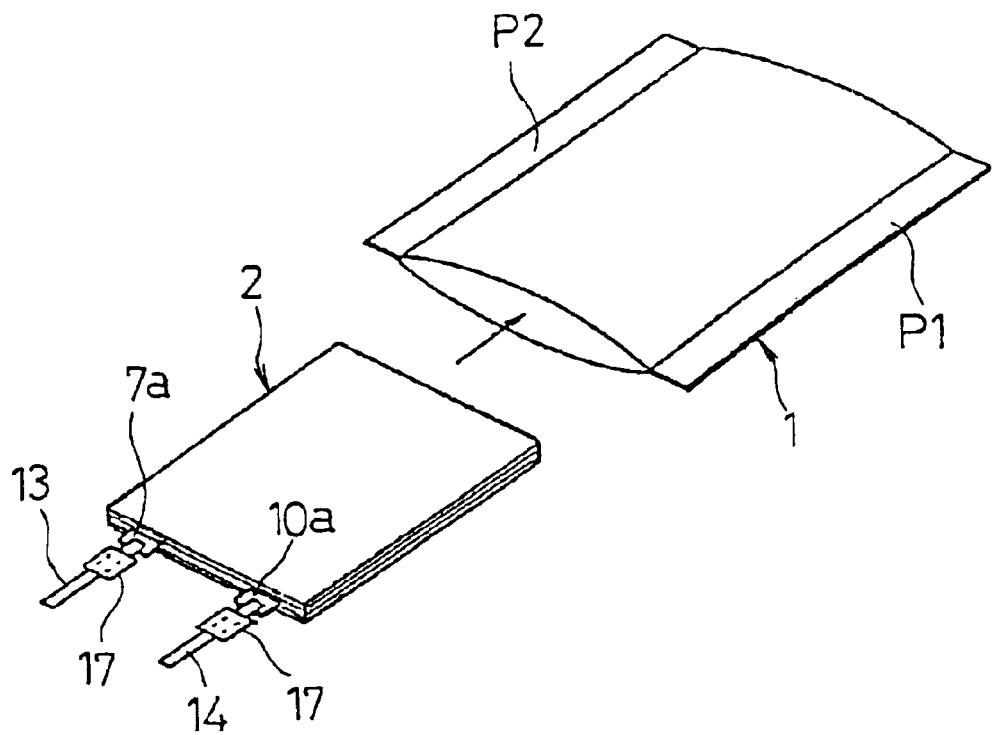
FIG. 38 is a perspective view illustrating the electrode assembly before being inserted into the casing.

The stacked electrode assembly 2 encased in the frame 19 is further enclosed within the laminate casing 1 made of a sheet of flexible laminate as has been shown in FIG. 38, after which a predetermined amount of liquid electrolyte is injected and the laminate casing 1 is sealed. Although not shown, the leads 13, 14 of the positive and negative electrodes are welded to one side of the casing 1 through the resin sheet 17 shown in FIG. 35 in an air- and liquid-tight manner. The weld joints between the leads 13, 14 through the resin sheet 17 and the casing 1 are located near the outer end edges of the protective pieces 31, 32. Thus the marginal edges or the protective pieces 31, 32 of the frame 19 cover the joints between the terminals 10a, 7a and the leads 13, 14 from both sides, and they have the length so that their outer edges will locate close to the weld joints between the leads 13, 14 and the casing 1. The frame 19 is made of resin having a melting point which is higher than that of the casing 1.

The provision of the inner frame 19 makes possible the setting of a seam along which the sheet of flexible laminate casing 1 is sealed to as close as possible to the distal ends of the protective pieces 31, 32. Thus the frame 19, having high rigidity and securely accommodating the electrode assembly 2 therein, is tightly enclosed within the flexible laminate casing 1. Therefore the electrode assembly 2 is reliably retained within the casing 1 through the frame 19, even when subjected to repeated vibration or large impact, whereby various troubles experienced in prior art resulting from loose packaging of the electrode assembly 2 are prevented. According to the battery of the invention, moreover, the electrode assembly 2 is encased in the frame 19 and no part thereof contacts the laminate casing 1, eliminating the risk that pointed corners or burrs on the electrode assembly 2 may damage the flexible laminate casing 1. Furthermore, mechanically week portions, such as the weld joints between the leads 13, 14 of the positive and negative electrodes and their respective terminals 10a, 7a, and the joints between the leads 13, 14 and the laminate casing 1, are enclosed within the cavity formed between the protective pieces 31, 32, so that they will receive no direct impact.

Preferably, the protective pieces 31, 32 should be resiliently deformable, so as to allow their respective distal end edges to be brought to close proximity to each other, when sealing the laminate casing 1 by applying pressure and heat. This also ensures reliable fixing of the frame 19 in position within the casing 1. By bending the distal end edges of the protective pieces 31, 32 towards each other, the cavity formed therein will have a triangular cross-section, for advantageously accommodating the bundles of positive and negative terminals 10a, 7a in a secure manner. The triangular construction also helps enhance the rigidity of the frame itself.

Although not shown, a resin-made connection pin may be provided to connect together a central portion and left and right end portions of the protective pieces 31, 32, for the reinforcing purpose. This will ensure reliable protection of the joints between the leads 13, 14 and the terminals 10a, 7a against impact, and restrict displacement of the electrode assembly 2.

Figure 3:
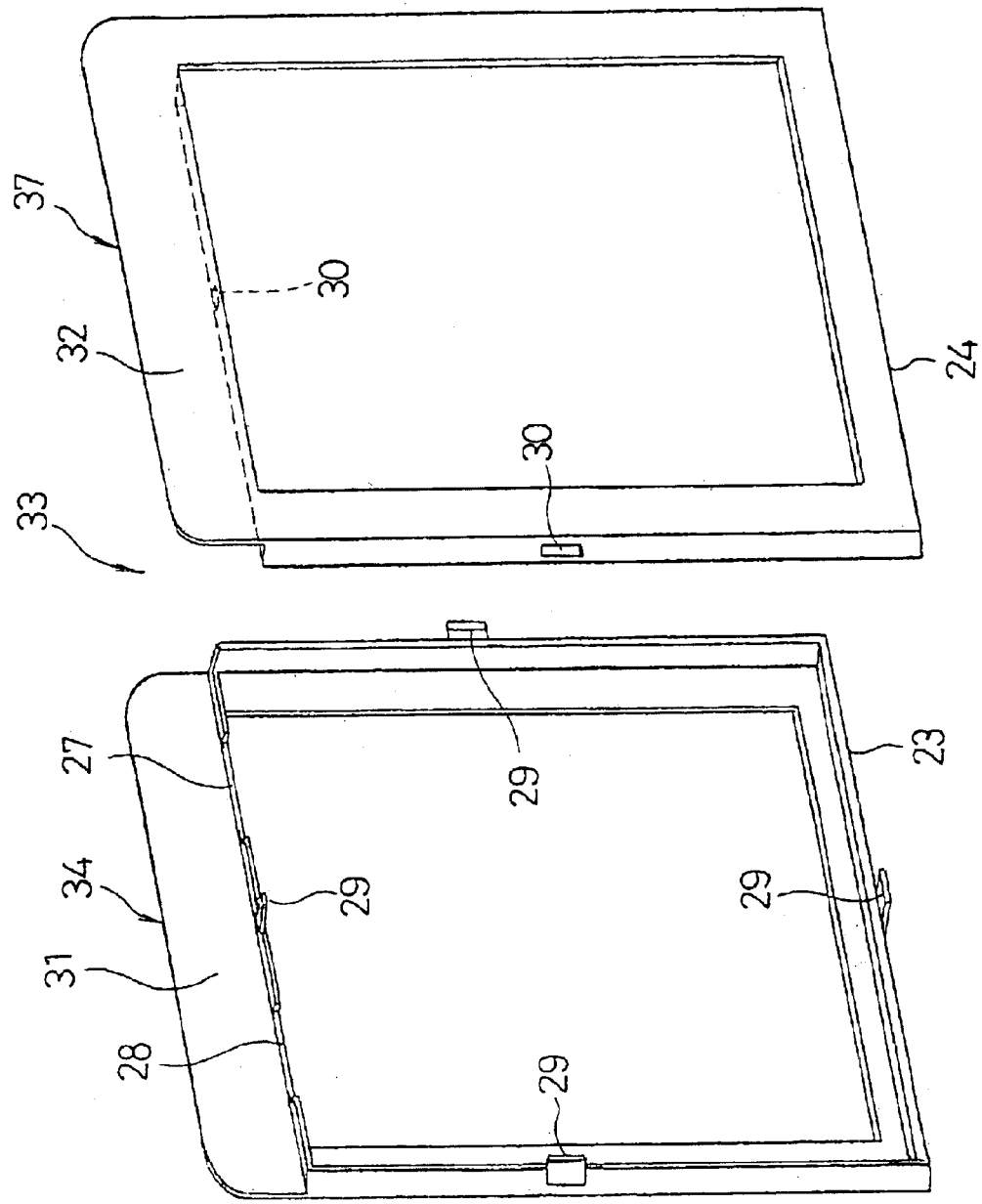
FIG. 3 is an exploded perspective view showing a modified example of the frame.

FIG. 3 is an exploded perspective view illustrating a protective frame 33 according to a modified example of this embodiment. The frame 33 has no hinge 22 as in the one-piece frame 19 shown in FIG. 2, and is divided into two parts 34, 37. Like elements in FIG. 3 are given the same reference numerals as those of FIG. 2. First and second parts 34, 37 respectively include a first and a second half frames 23, 24 having a shape so as to form a cavity for tightly accommodating the stacked electrode assembly 2 therein when overlaid upon one another. The first half frame 23 has a pair of notches 27, 28 on one side thereof for forming apertures to pass through the bundled terminals 10a, 7a of the positive and negative electrodes, and four hooks 29 in the center on each of the four sides thereof. The second half frame 24 is formed with corresponding holes 30 on each of its four sides for engagement with the hooks 29. Marginal pieces integrally extend from one end of the half frames 23, 24 of each part 34, 37 to form protective pieces 31, 32.

The two parts 34, 37 are united to look like the frame 19 shown in FIG. 2 by abutting the first and second half frames 23, 24 and locking them with the hooks 29 and the holes 30, with the electrode assembly 2 encased therein. Similarly to the example with the frame 19, the frame 33 is capable of reliably protecting the electrode assembly 2 and preventing its displacement. Additional advantage of the frame 33 is that it is readily fabricated due to is more simple construction.

(Second Embodiment)

Figure 4:
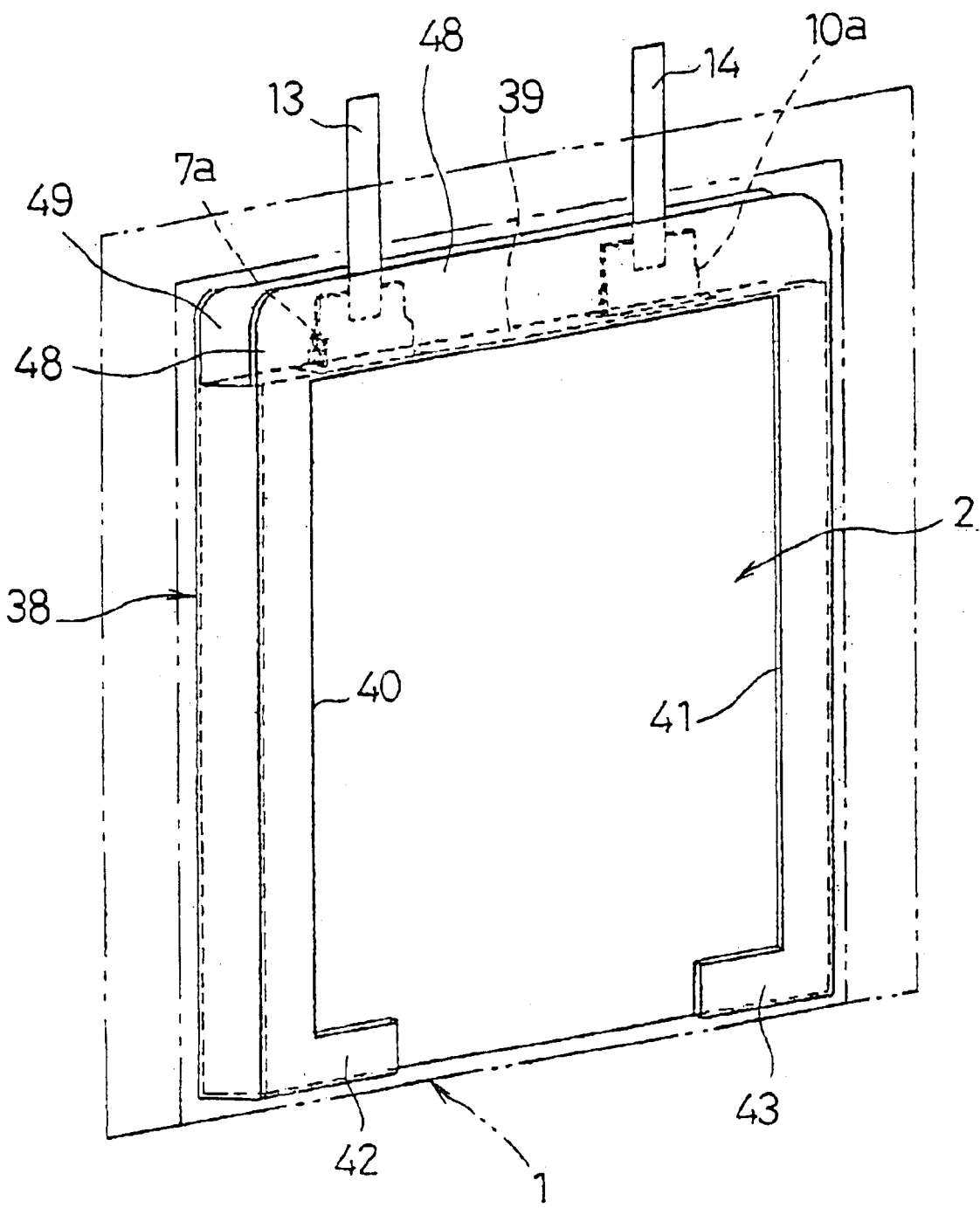
FIG. 4 is a perspective view illustrating a battery with a laminate casing according to a second embodiment of the present invention.

FIG. 4 is a perspective view showing a battery with laminate casing according to a second embodiment of the present invention. Similarly to the first embodiment, the battery includes a rectangular, flat electrode assembly 2 encased in a protective frame 38, which is further enclosed within a flexible laminate casing 1, for providing protection against vibration or impact. The difference is that the one-piece frame 38 made of resin such as polypropylene has a further simplified, substantially C-shaped configuration.

Figure 5:
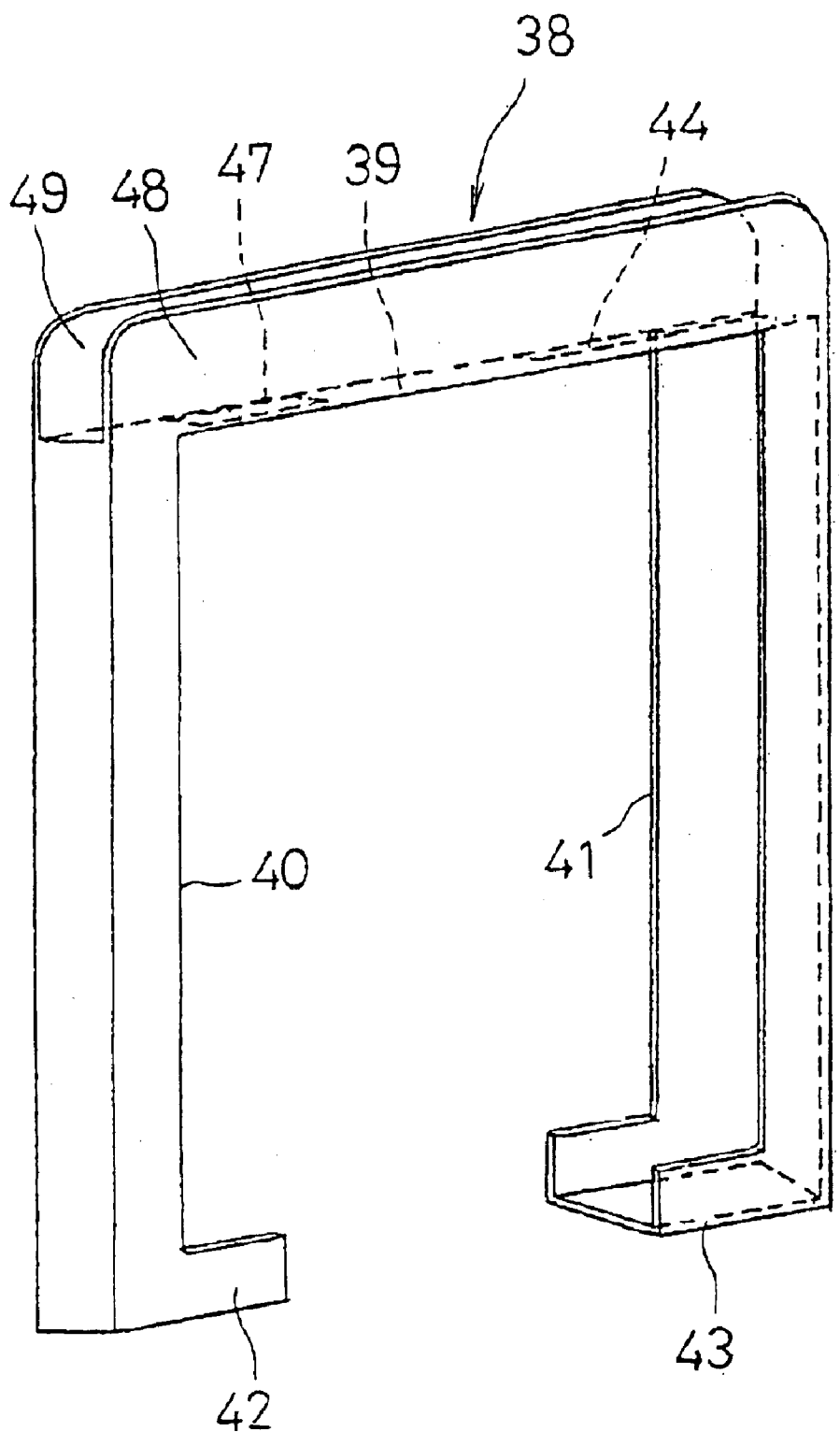
FIG. 5 is a perspective view of a frame for the battery in an opened-out condition.

The protective frame 38 generally has a C shape as shown in the perspective view of FIG. 5, including an abutment portion 39 which abuts one end of the electrode assembly 2 from which the positive and negative electrode terminals 10a, 7a extend, a pair of legs 40, 41 extending from both ends of the abutment portion 39 orthogonally and having a C-shaped cross-section for accommodating side edges of the electrode assembly 2, and a pair of support frames 42, 43 slightly extending inwards and orthogonally from the ends of the legs 40, 41, and having a C-shaped cross-section for accommodating either side edge of the other end of the electrode assembly 2. The planar abutment portion 39 has certain resiliency and can be warped to spread apart the legs 40, 41.

The abutment portion 39 is formed with a pair of through holes 44, 47 for passing through the bundles of positive electrode terminals 10a and negative electrode terminals 7a. From both side edges along the lengthwise direction of the abutment portion 39 protrude a pair of protective pieces 48, 49, which extend as far as to reach a resin seal (not shown) attached to the leads 13, 14 where the laminate casing 1 is sealed.

To attach the frame 38 to the electrode assembly 2, the legs 40, 41 are spread apart to allow the electrode assembly 2 to be inserted inside the frame 38, with the leads 13, 14 and the terminals 10a, 7a being passed through the holes 44, 47 and the end face of the electrode assembly being abutted against the abutment portion 39. When the legs 40, 41 are released, they restore to their initial positions and tightly fit to the opposite side edges of the electrode assembly 2. Meanwhile, the support frames 42, 43 fit to both side edges of the other end of the electrode assembly 2 to retain the same in position. The frame 38 is formed in one piece and has a more simplified C-shaped construction and a reduction in material cost is achieved as compared to the frames 19 or 33 of the first embodiment. Also, the attachment of the frame 38 to the electrode assembly 2 is easier as it entails no locking engagement.

The electrode assembly 2 with the frame 38 attached thereto is then accommodated in a bag-shaped flexible laminate casing 1 shown by double-dotted chain lines in FIG. 4, and the casing 1 is sealed after liquid electrolyte is injected. The frame 38 is made of resin having a higher melting point than the casing 1, so that the leads 13, 14 can be joined to the casing 1 at positions as near the end edges of the protective pieces 48, 49 as possible. Thus the completed battery accommodates the electrode assembly 2 tightly within the flexible laminate casing 1 via the rigid protective frame 38.

Accordingly, even when subjected to repeated vibration or large impacts, the electrode assembly 2 is retained in position within the flexible laminate casing 1 because of the frame 38. Various troubles resulting from displacement of the electrode assembly 2 are thereby prevented. The rectangular electrode assembly 2, having four pointed corners, is covered by the C-shaped frame 38, so that the flexible laminate casing 1 will not be damaged. Also, the weld joints between the leads 13, 14 and the terminals 10a, 7a and those between the leads 13, 14 and the casing 1, which are mechanically weak, are accommodated in the cavity between the protective pieces and protected from impacts.

The protective pieces 48, 49 may be joined by connector pins at several locations for forming a U-shaped, rigid cavity therein. This will, not only ensure reliable protection of the joints between the leads 13, 14 and the terminals 10a, 7a against impact, but also reinforce the protective pieces 48, 49 themselves and restrict displacement of the electrode assembly 2.

Figure 6:
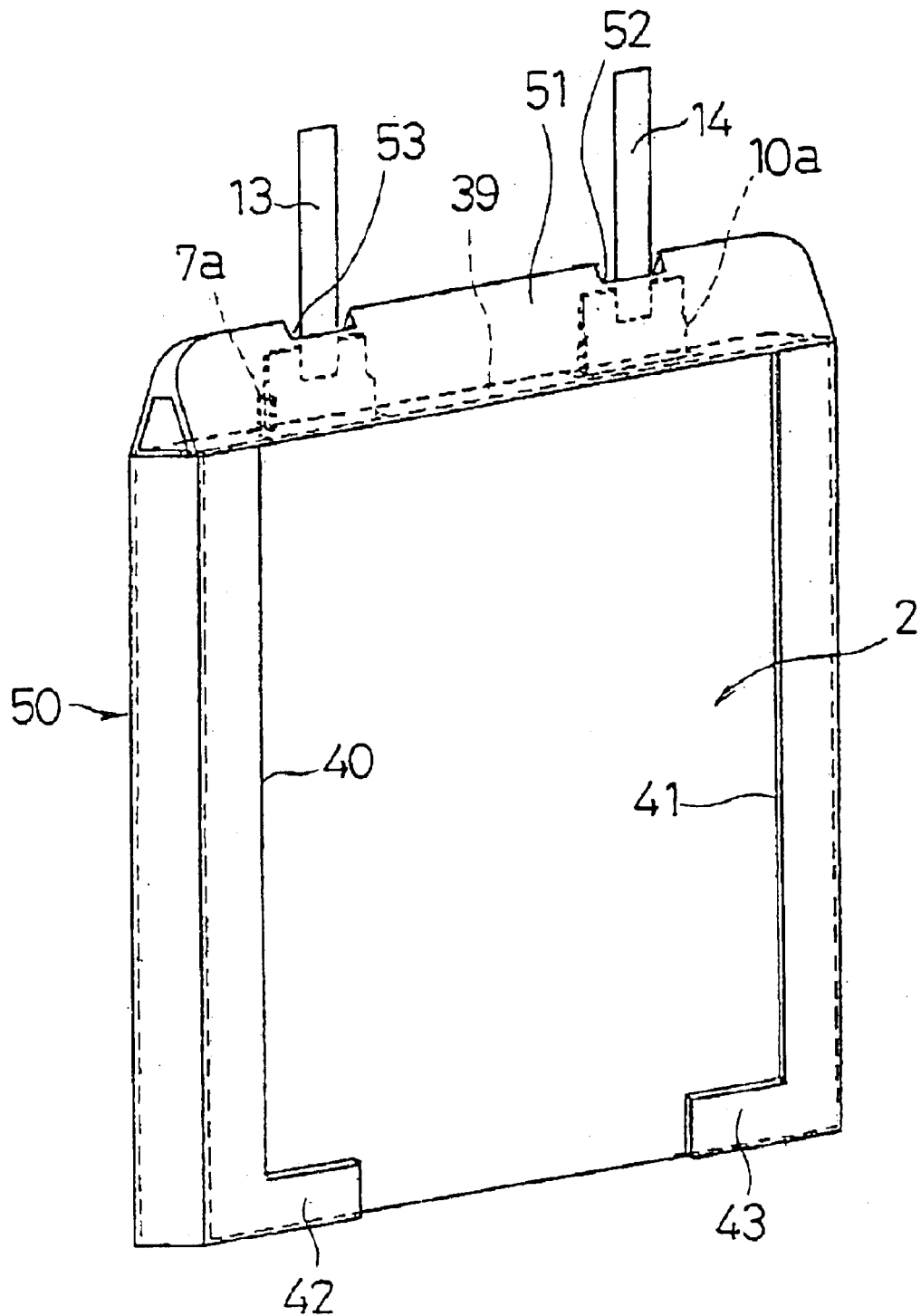
FIG. 6 is a perspective view showing a modified example of the battery according to the above embodiment before being accommodated in the casing.

FIG. 6 is a perspective view showing another protective frame 50, which is a modified example of the above-described frame 38, attached to the electrode assembly 2. Like elements of the frame 50 are given the same reference numerals as those of FIG. 4 and FIG. 5, and the description thereof will be omitted. Similarly to the frame 38, the frame 50 is formed in one piece, having a C-shaped configuration including an abutment portion 39, a pair of legs 40, 41, and a pair of support frames 42, 43. Instead of the protective pieces 48, 49 of the frame 38, the frame 50 includes a cover 51 projecting inwards from both sides and along the length of the abutment portion 39 such as to form a cavity having a triangular cross-section therein. The cover 51 is formed with slits 52, 53 for passing through the leads 13, 14 to the outside.

With such cover 51 having a higher rigidity than the protective pieces 48, 49, the joints between the leads 13, 14 and the terminals 10a, 7a inside are more reliably protected against impacts. The pointed shape of the cover 51 facilitates insertion of the electrode assembly 2 into the casing 1. Also, the slopes inside the cavity formed by the cover 51 are advantageous to guide the leads 13, 14 smoothly towards and through the slits 52, 53.

Figure 7:
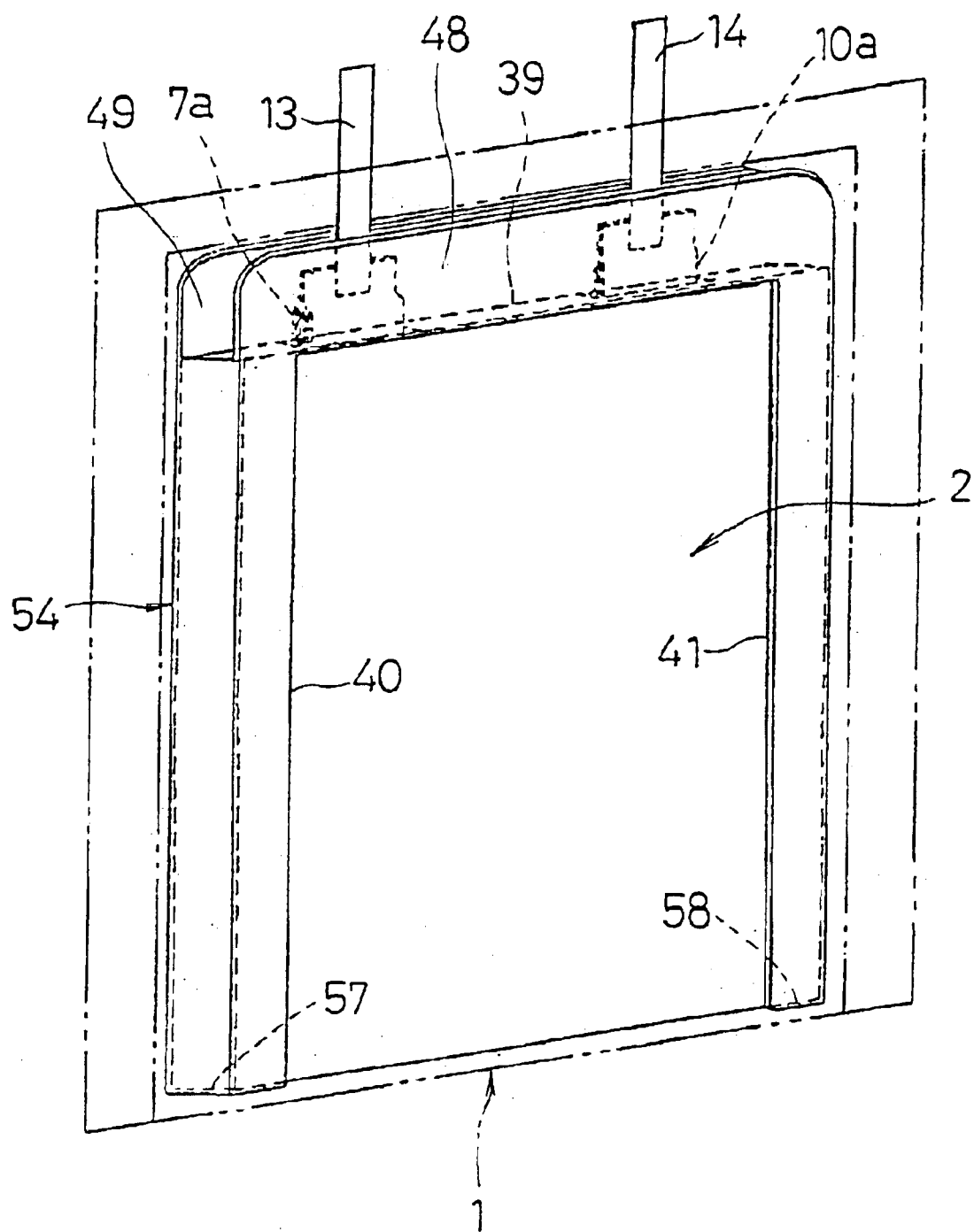
FIG. 7 is a perspective view showing a modified example of the battery according to the above embodiment.

FIG. 7 is a perspective view illustrating a battery with a protective frame 54, which is another modified example of the frame 38. Like elements of the frame 54 are given the same reference numerals as those of FIG. 4 and FIG. 5, and the description thereof will be omitted. The frame 54 is formed in one piece and has a U-shape including the abutment portion 39, a pair of legs 40, 41, and a pair of protective pieces 48, 49 protruding from both sides and along the length of the abutment portion 39. Unlike the frame 38, the frame 54 has no support frames 42, 43, and the distal ends of the legs 40, 41 are closed with connector plates 57, 58.

While the frame 54 has no support frames 42, 43, the connector plates 57, 58 are formed instead to retain the electrode assembly 2 in position, as well as to cover the corners on one end of the electrode assembly 2. A reduction in material cost is achieved due to the omission of the support frames 42, 43, and attachment of the frame 54 to the electrode assembly 2 is further facilitated.

(Third embodiment)

Figure 8:
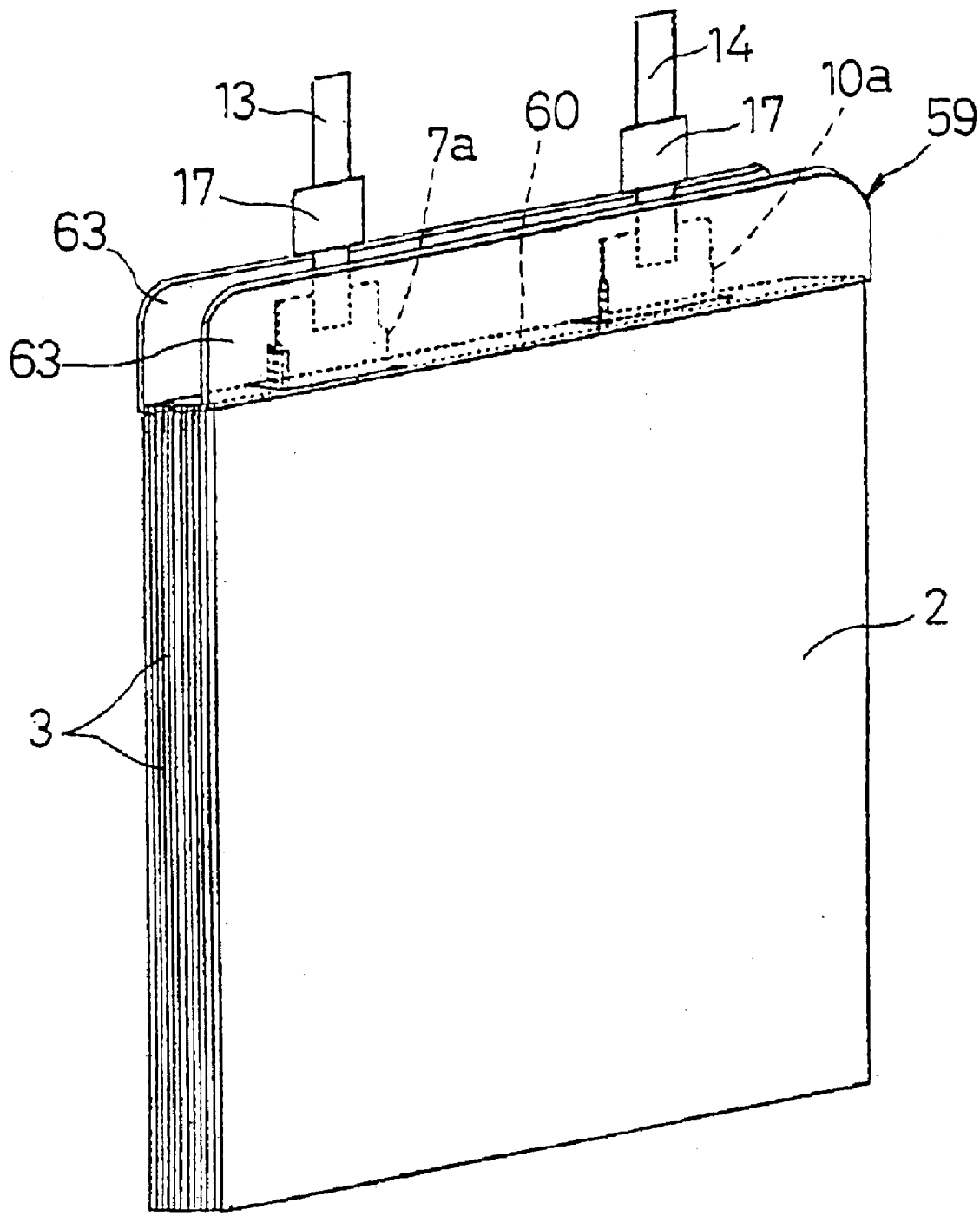
FIG. 8 is a perspective view illustrating an electrode assembly with an insulative spacer of a battery with a laminate casing according to a third embodiment of the present invention.
Figure 9:
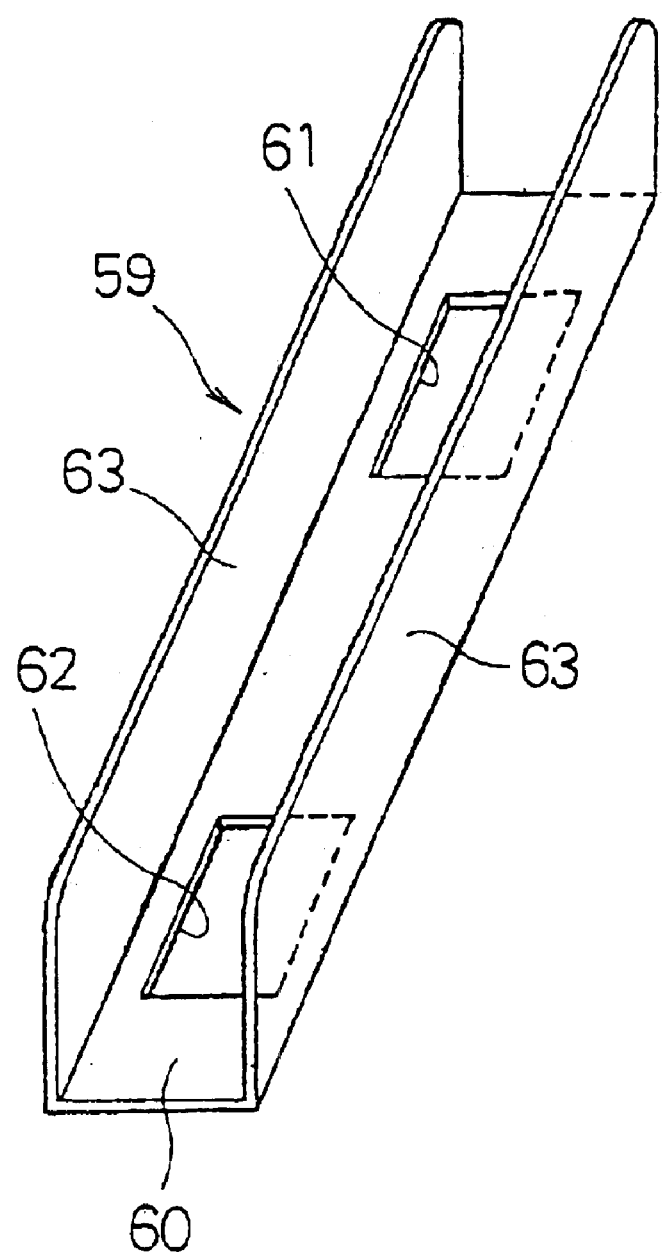
FIG. 9 is a perspective view showing an insulating spacer for the battery.

FIG. 8 is a perspective view illustrating a battery according to a third embodiment of the invention, in which an insulating spacer 59 is attached to the electrode assembly 2. The insulating spacer 59 is provided to one end face of the electrode assembly 2 where the positive electrode terminal 10a and the negative electrode terminal 7a are located, and is formed to have a U-shaped cross-section as shown in the perspective view of FIG. 9, so that it does not contact the non-aqueous electrolyte. Polypropylene or other resin having a higher melting point than the resin layer of the inner side of the laminate casing 1 is used for the insulating spacer 59. Holes 61, 62 for respectively passing through the positive electrode terminals 10a and the negative electrode terminals 7a are formed in the bottom 60 of the spacer 59.

Figure 10:
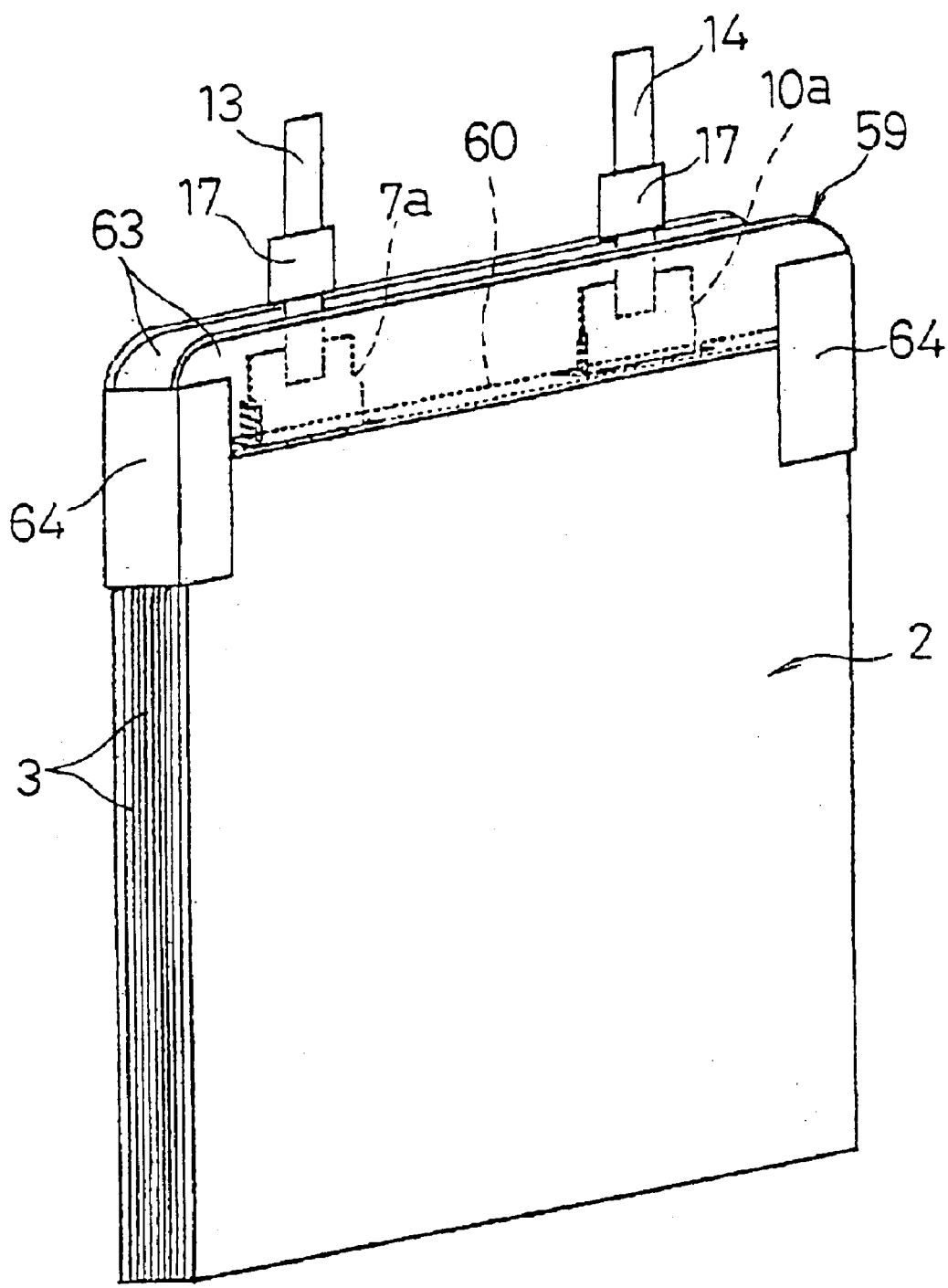
FIG. 10 is a perspective view showing the insulating spacer attached to the electrode assembly.
Figure 11:
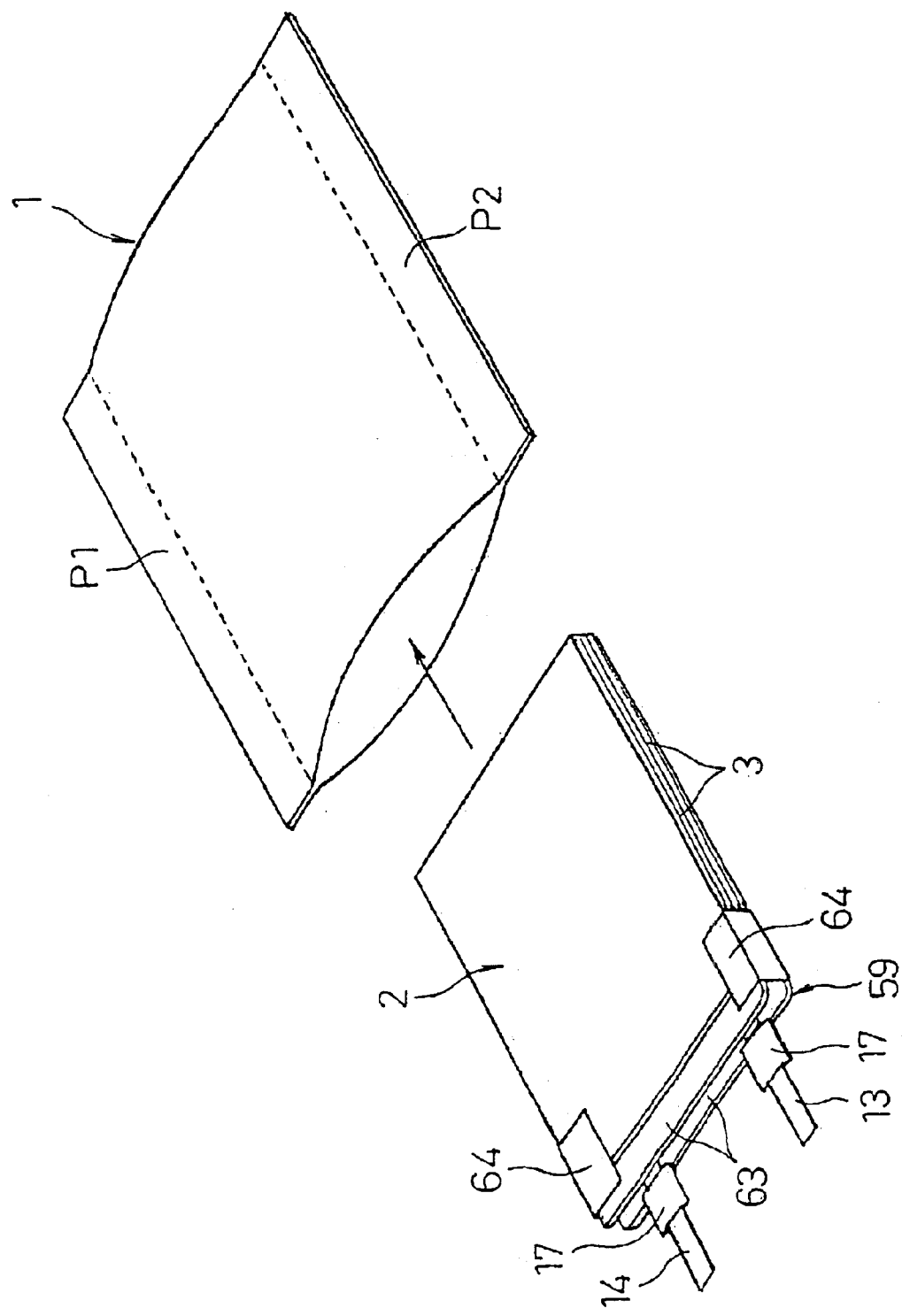
FIG. 11 is a perspective view of the electrode assembly being inserted into the laminate casing.

The spacer 59 has side walls 63 standing upright from both sides of the bottom 60 to cover the positive electrode terminals 10a and the negative electrode terminals 7a. The side walls 63 are high enough to nearly reach the resin sheet 17, with which the leads 13, 14 are joined to the laminate casing 1. The spacer 59 is placed atop the electrode assembly 2, with the leads 13, 14 being passed through the holes 61, 62 and the bottom 60 being in contact with the end face of the electrode assembly 2, and fixed in position with adhesive tapes 64 attached on both sides near one end of the electrode assembly 2, as shown in FIG. 10. Thus the four corners on one end of the electrode assembly 2 are covered by the adhesive tapes 64. The electrode assembly 2 is then inserted into the bag-shaped laminate casing 1 as shown in FIG. 11.

With the electrode assembly 2 within the casing 1, a predetermined amount of liquid electrolyte is injected into the casing 1. Thereafter, the laminate casing 1 is sealed by applying pressure and heat to form a seam along one end edge, where the leads 13, 14 extend to the outside. The leads 13, 14 are preliminarily provided with a piece of resin sheet 17 at predetermined locations on both sides thereof, so as to insulate the metal layer in the laminate sheet from the leads 13, 14, and to ensure reliable sealing, which entails application of heat, of the laminate casing through the leads 13, 14.

Figure 12:
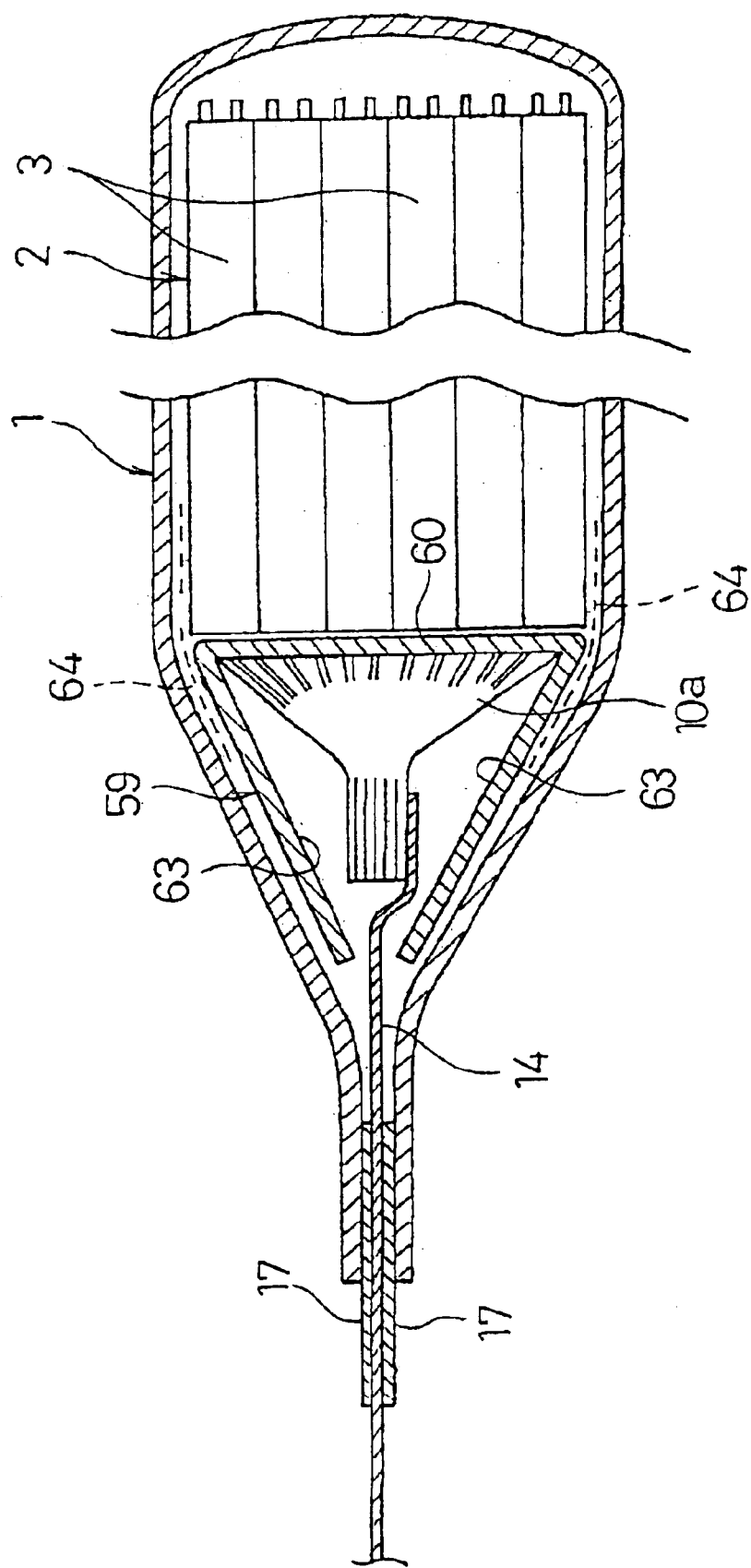
FIG. 12 is a longitudinal cross-sectional view of the battery.

FIG. 12 is a cross-sectional view showing the electrode assembly 2 enclosed in the casing 1. The insulating spacer 59 is made of a resin having a higher melting point than that of the casing 1, so that the sealing of the two laminate sheets of the casing with the leads 13, 14 and the resin sheet 17 interposed therebetween can be made at a nearest possible position to the distal ends of the side walls 63 of the spacer 59. The side walls 63 are bent inwards by the laminate sheets and fixedly confined within the cavity having a triangular cross-section defined by one end face of the electrode assembly 2 and the two laminate sheets of the casing 1.

Therefore, the electrode assembly 2 is held in position by the spacer 59 at the end of the leads, and restricted from moving within the casing 1 even when subjected to vibration or impact. Displacement of the electrode assembly 2 must be restricted as mentioned above because the leads 13, 14 made of thin metal foil can readily be bent and because the pointed corners of the electrode assembly 2 may damage the resin layer of the laminate casing 1. According to the battery of the invention, the electrode assembly 2 is kept in position as described above, and moreover, the pointed corners of the electrode assembly 2 are covered by the adhesive tapes 64, which are provided for fixing the spacer 59 to the electrode assembly 2. Thus the inside resin layer of the flexible laminate casing 1 is protected from damage caused by a large impact.

Figure 13:
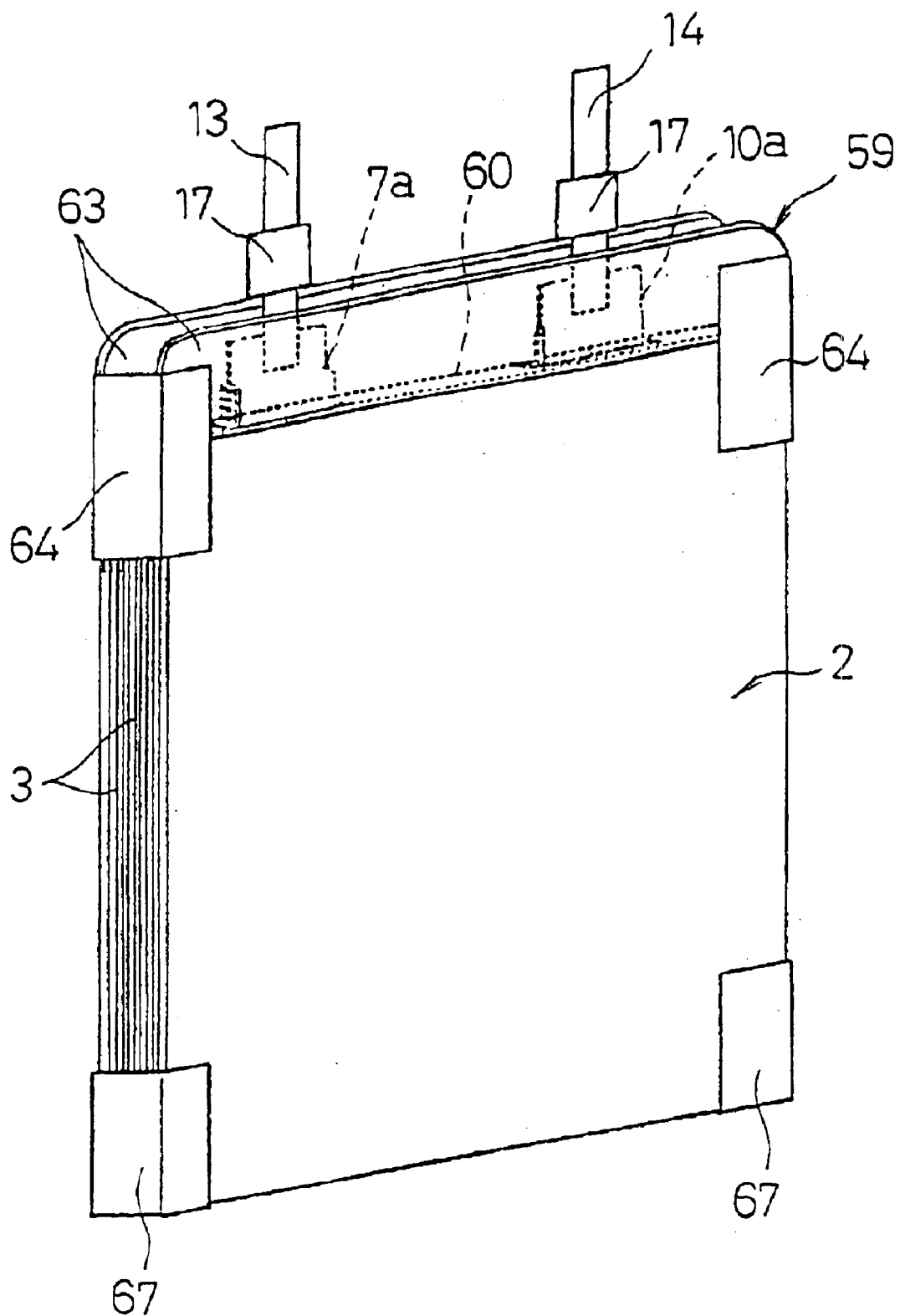
FIG. 13 is a perspective view of a modified example of the battery.

FIG. 13 is a perspective view showing a modified example of the above-described electrode assembly 2 before being inserted into the casing 1. In addition to the tapes 64 on one end of the electrode battery from which the terminals 10a, 7a extend, additional pieces of adhesive tape 67 are provided to either corner of the other end of the electrode assembly 2. With such additional adhesive tapes, should the electrode assembly 2 move within the casing 1, the inside resin layer of the flexible laminate casing 1 is protected from the pointed corners of the electrode assembly 2. The tapes 67 are also effective to protect the laminate casing 1 from damage caused by mishandling during the insertion of the electrode assembly into the casing 1.

Figure 37:
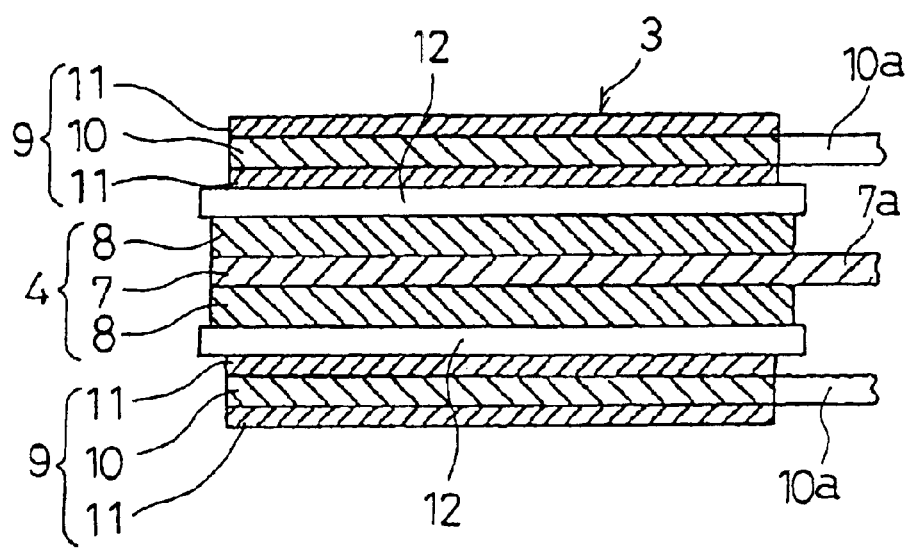
FIG. 37 is a cross-sectional view illustrating the construction of an electrode plate module in the battery.

For the purpose of protecting the inside resin layer of the flexible laminate casing 1 from the pointed corners of the electrode assembly, 2 separators 12 constructing each of the electrode plate modules 3 may have external dimensions larger than the positive electrode plates 9 and negative electrode plates 4. It should be noted that such arrangement is illustrated in FIG. 37 for the convenience of description, but is included in the scope of this embodiment of the invention.

Figure 14:
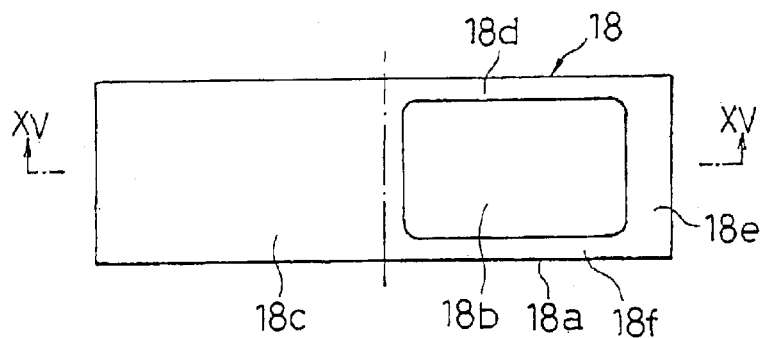
FIG. 14 is a plan view showing another example of the casing for the battery in an opened-out condition.
Figure 15:
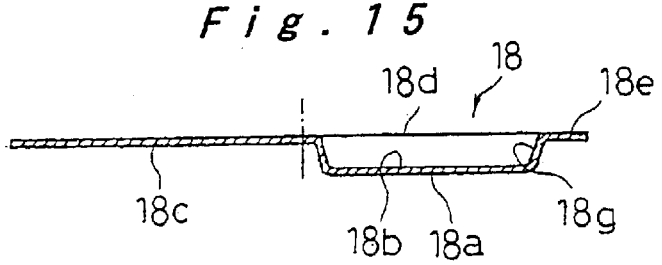
FIG. 15 is a cross-sectional view taken along the line XV—XV of FIG. 14.
Figure 16:
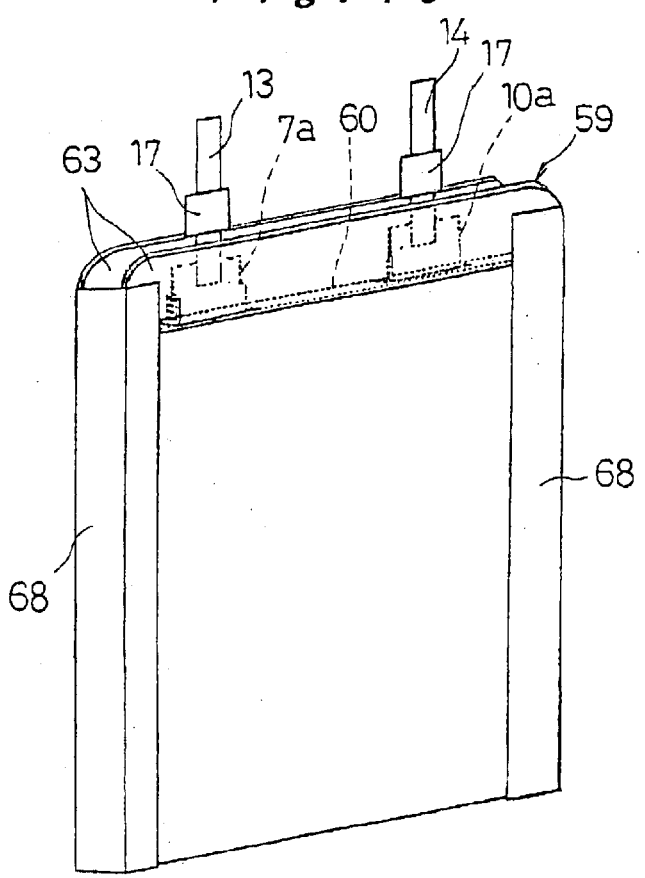
FIG. 16 is a perspective view showing a further modified example of the battery.
Figure 39:
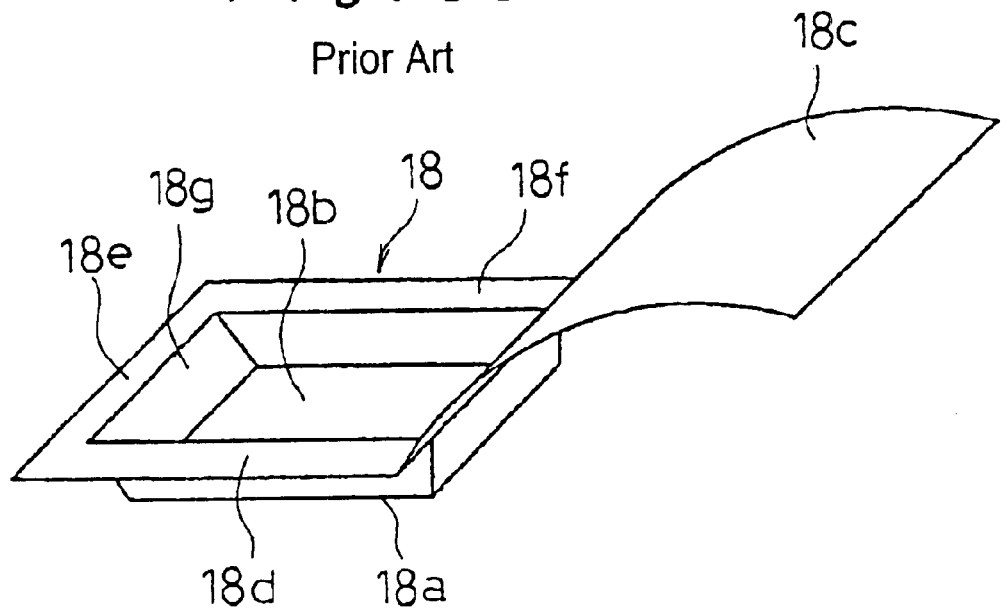
FIG. 39 is a perspective view illustrating another casing used in a prior art battery.
Figure 40:
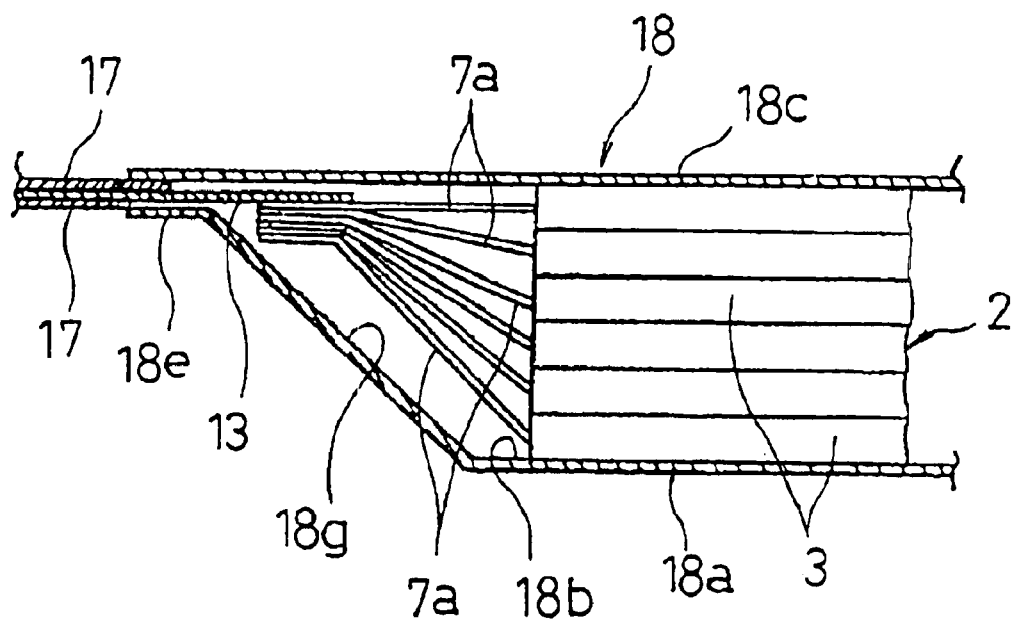
FIG. 40 is a partial cross-sectional view illustrating the battery.

FIG. 14 is a plan view illustrating another type of casing 18 similar to the one shown in FIG. 39, and FIG. 15 is a cross-sectional view along the line XV—XV of FIG. 14. With such casing 18, end faces of the electrode assembly 2 except the face where the terminals 10a, 7a extend are made to form flat surfaces, so that the electrode assembly 2 can snugly fit into the recess 18b. Eight corners of the electrode assembly 2 which are made sharp by the cutting are all covered by the adhesive tapes 68, extending from the spacer 59 on one end of the electrode assembly 2 to the other end thereof. Thus the inside resin layer of the laminate sheet is protected from pointed corners or sharp edges of the electrode assembly 2 even when the battery is subjected to vibration or impact.

The arrangements described above are mainly directed to the protection of the battery from damages caused by displacement of the electrode assembly 2 within the casing 1 or 18 when the battery is subjected to vibration or impact. Another problem caused by vibration or impact is that the plurality of stacked electrode plate modules 3 may be offset from each other. This is particularly the case when one of the electrode plates has a larger size than the other, as in the example illustrated in FIG. 37. Offsetting of the electrode plate modules 3 may cause a negative electrode plate 4 to contact the positive electrode terminals 10a, resulting in an internal short circuit.

Figure 17:
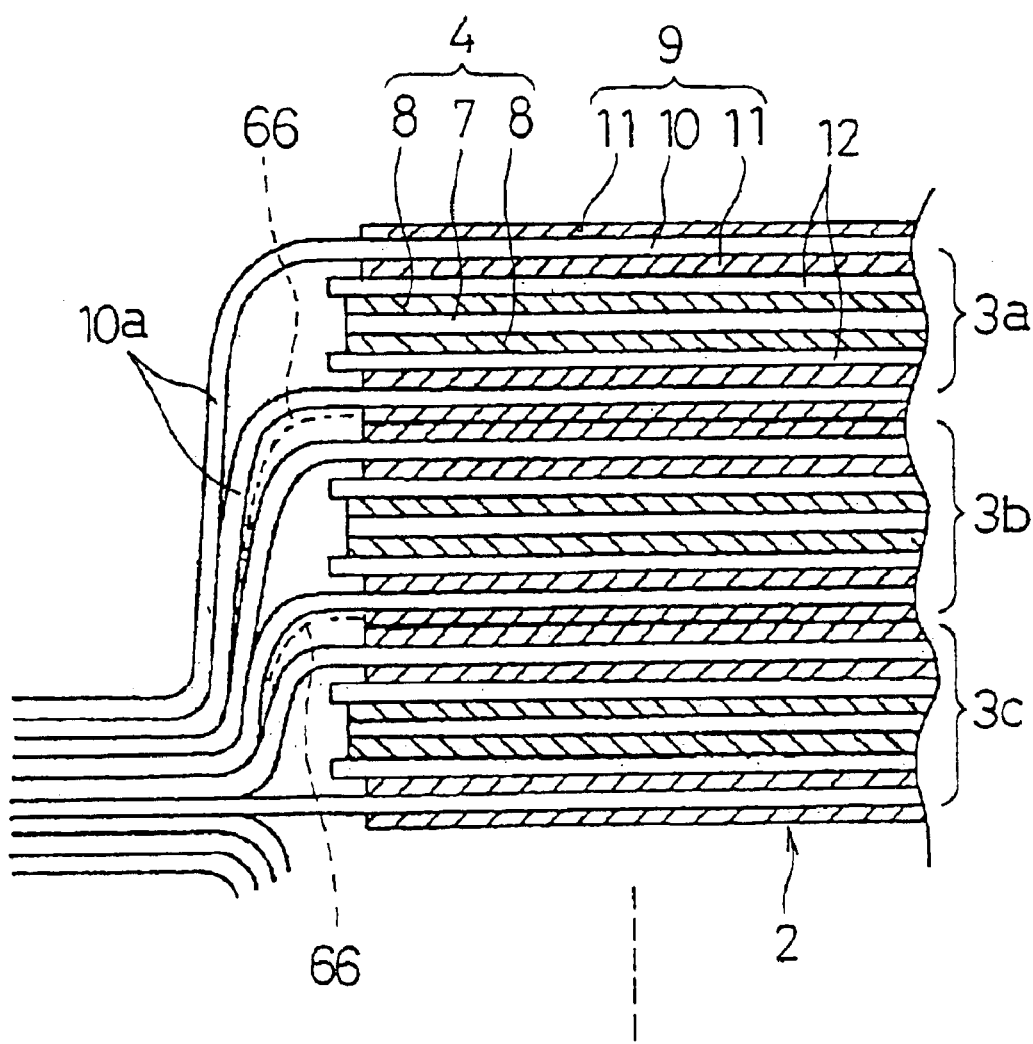
FIG. 17 is a longitudinal cross-sectional view showing a further embodiment of the invention wherein insulative coating is provided.

FIG. 17 is a partial cross-section of a portion of the stacked electrode assembly 2 near the positive electrode terminals 10a, given in explanation of a construction for preventing short-circuiting caused by offsetting between the plurality of stacked electrode plate modules 3a to 3c. Since the negative electrode plates 4 protrude outwards further than the positive electrode plates 9, they may contact the positive electrode terminals 10a upon displacement of offsetting of one of the electrode plate modules 3a to 3c.

Accordingly, it is preferable to provide the positive electrode terminals 10a, at least on one side thereof adjacent the electrode plate modules 3b or 3c, as illustrated by the broken lines in FIG. 17, with an insulating film 66 or coating. In practical application, both sides of all positive electrode terminals 10a may be coated with resin to facilitate the fabrication of positive electrode plates 10 and the assembling of the electrode plate modules 3a to 3c.

With the provision of the insulating film or coating 66 in addition to the insulating spacer 59 and the adhesive tapes 64, 67 as described above, the battery with the flexible laminate casing can reliably withstand vibration or impact.

(Fourth Embodiment)

Figure 18A:
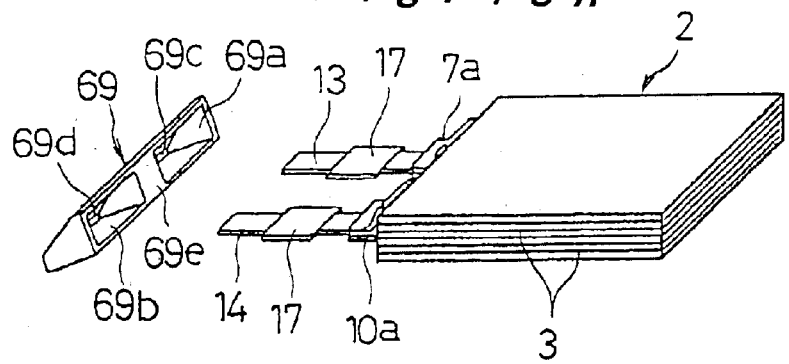
FIG. 18A and FIG. 18B are perspective views showing the fabrication process steps of a battery with a laminate casing according to a fourth embodiment of the present invention, FIG. 18A illustrating an electrode assembly before attaching an insulating spacer thereto, and FIG. 18B illustrating same after the insulating spacer is attached thereto.
Figure 18B:
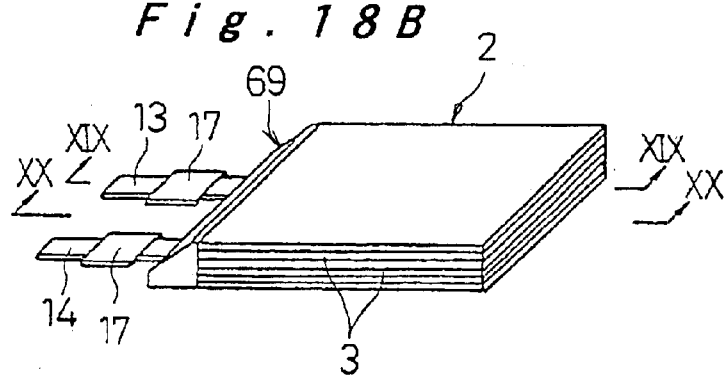
Figure 19:
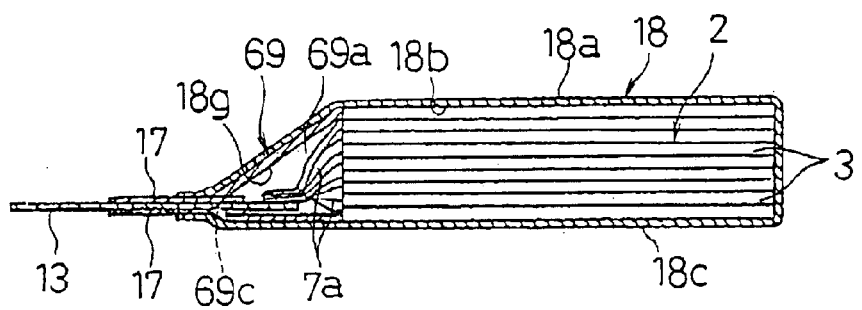
FIG. 19 is a cross-sectional view seen in the direction of the arrows along the line XIX—XIX of FIG. 18B when constituted as a battery.
Figure 20:
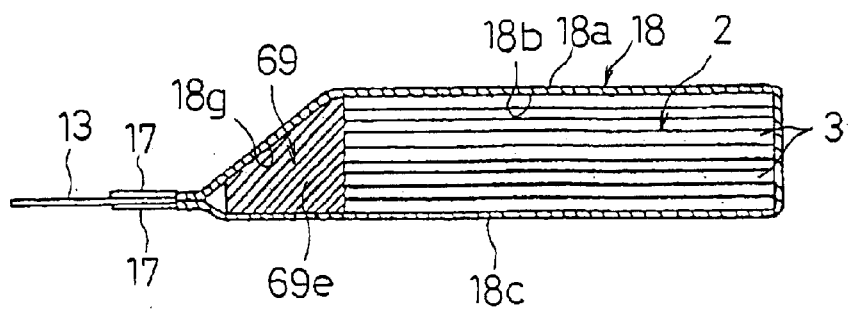
FIG. 20 is a cross-sectional view seen in the direction of the arrows along the line XX—XX of FIG. 18B when constituted as a battery.

FIG. 18A to FIG. 20 illustrate, in sequence, the process steps for fabricating a battery with a flexible laminate casing according to a fourth embodiment of the present invention. FIG. 18A is a perspective view of the electrode assembly 2 before attaching an insulating spacer 69 thereto, FIG. 18B is a perspective view of the same with the spacer 69, FIG. 19 is a cross-sectional view of a finished battery taken along the line XIX—XIX of FIG. 18B, and FIG. 20 is a cross-sectional view of the battery taken along the line XX—XX of FIG. 18B.

The electrode assembly 2 shown in FIG. 18A is composed of a plurality of stacked electrode plate modules 3 shown in FIG. 37 to attain a predetermined voltage or capacity. Terminals 10a, 7a of positive and negative electrodes extend from one end and bundled together, with leads 13, 14 respectively joined to the bundles of the terminals.

This embodiment is another example of the casing 18 shown in FIG. 39, wherein a recess 18b is formed in the base part 18a. The insulating spacer 69 is formed in one piece of a nonaqueous electrolyte-resistant material having a high melting point such as polypropylene, of which melting point is higher than that of the inside resin layer of the casing 18. The spacer 69 has a shape conforming to the space defined by one end face of the electrode assembly 2 where the positive and negative electrode terminals 10a, 7a exist, the cover 18c and the inclined surface 18g of the casing 18. The end face of the spacer 69 on the side of the electrode assembly 2 is shaped somewhat smaller than the cross-sectional shape of the electrode assembly 2. The spacer 69 has compartments 69a, 69b therein for accommodating each one of the negative and positive electrode terminals 7a, 10a bundled in substantially triangular shapes, apertures 69c, 69d for passing the negative and positive electrode leads 13, 14, and a reinforcing wall 69e or a partition between the two compartments 69a, 69b, all of these being formed in one piece.

Before inserting the electrode assembly 2 into the recess 18b of the casing 18, the negative and positive electrode leads 13, 14 are passed through the apertures 69c, 69d so as to accommodate respective terminals 7a, 10a within the compartments 69a, 69b. Thus the spacer 69 is mounted to one end face of the electrode assembly 2 as shown in FIG. 18B. Preferably, the spacer 69 should be fixed to the electrode assembly 2 with a tape or the like.

The electrode assembly 2 with the spacer 69 attached thereto is then fitted into the recess 18b of the casing 18, with the leads 13, 14 extending to the outside of the base part 18a through the seal flange 18e. The cover 18c is closed, and the opposite sides of the cover 18c are joined to the seal flanges 18d, 18f by applying heat and pressure. Liquid electrolyte is then injected into the casing through the opening between the remaining seal flange 18e and one side edge of the cover 18c, and thereafter, the seal flange 18e and the remaining side edge of the cover 18c are joined together by applying heat and pressure to seal the casing 18.

To the leads 13, 14 where they extend on the seal flange 18e are joined a piece of resin sheet 17 made of polypropylene film from both sides thereof by applying heat and pressure. Therefore, at the seal flange 18e where the leads 13, 14 pass, the inside resin layer of the upper and lower laminate sheets of the casing 18 are joined to the resin sheet 17. Here, since the insulating spacer 69 has a higher melting point than the casing 18, the resin sheet 17 can be joined to the upper and lower laminate sheets of the casing 18 at a nearest possible position to the spacer 69.

The battery thus assembled has the resin sheet 17 interposed between the leads and the laminate sheets of the casing 18 at a position nearest possible to the insulating spacer 69, and therefore, when accommodated in the casing 18, the spacer 69 is fixedly enclosed within the space surrounded by one end face of the electrode assembly 2 and the cover 18c and inclined surface 18g of the casing 18, with the reinforcing wall 69e being pressed toward the end face of the electrode assembly 2. Also, as the end face of the spacer 69 on the electrode assembly 2 side is formed slightly smaller than the cross-sectional shape of the electrode assembly 2 as mentioned above, the peripheral edge of the spacer 69 makes contact with the electrode assembly 2.

Due to the construction described above, even though the battery mounted on a portable electronic device is subjected to frequent vibration or large impacts, the electrode assembly 2 remains fixed, ensuring that leads 13, 14 or casing 18 will not be damaged, and that no short-circuiting will occur across the casing 18 and the electrode assembly 2. Consequently, the battery is free of troubles such as output failure, electrolyte leakage, or corrosion of metal layer in the casing 18 by the electrolyte.

Figure 21A:
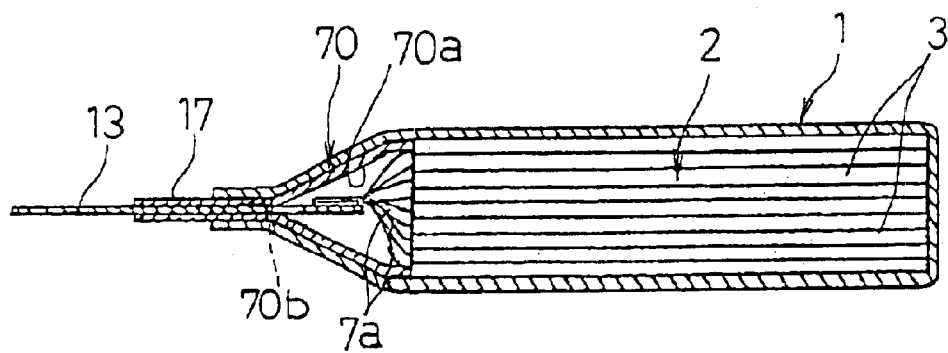
FIG. 21A and FIG. 21B are cross-sectional views showing a modified example of the battery, respectively sectioned along the negative electrode lead and the central region.
Figure 21B:
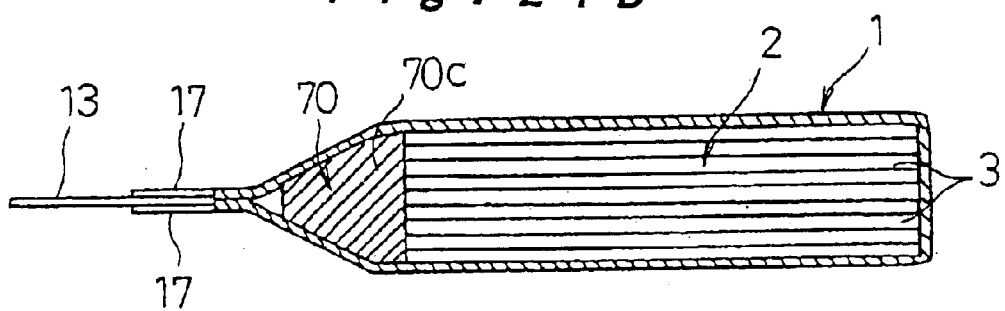

FIGS. 21A and 21B illustrate a modified example of the fourth embodiment, in which the electrode assembly 2 enclosed in an envelop-like casing 1 in a fixed state by the use of an insulating spacer 70. FIG. 21A is a cross-sectional view across a line along the negative electrode lead 13, while FIG. 21B is a cross-sectional view across a center line along the length of the battery. The negative and positive electrode leads 13, 14 in this battery extend from the electrode assembly 2 at a position in the middle in the thickness direction of the electrode assembly 2. Accordingly, the spacer 70 has a pair of apertures 70b in the middle thereof. Apart from that, the spacer 70 has two compartments 70a and a reinforcing wall 70c as a partition for the compartments, similarly to the abovedescribed spacer 69. The spacer 70 is attached to the electrode assembly 2 similarly to the spacer 69 to achieve the same effects mentioned above.

Figure 22:
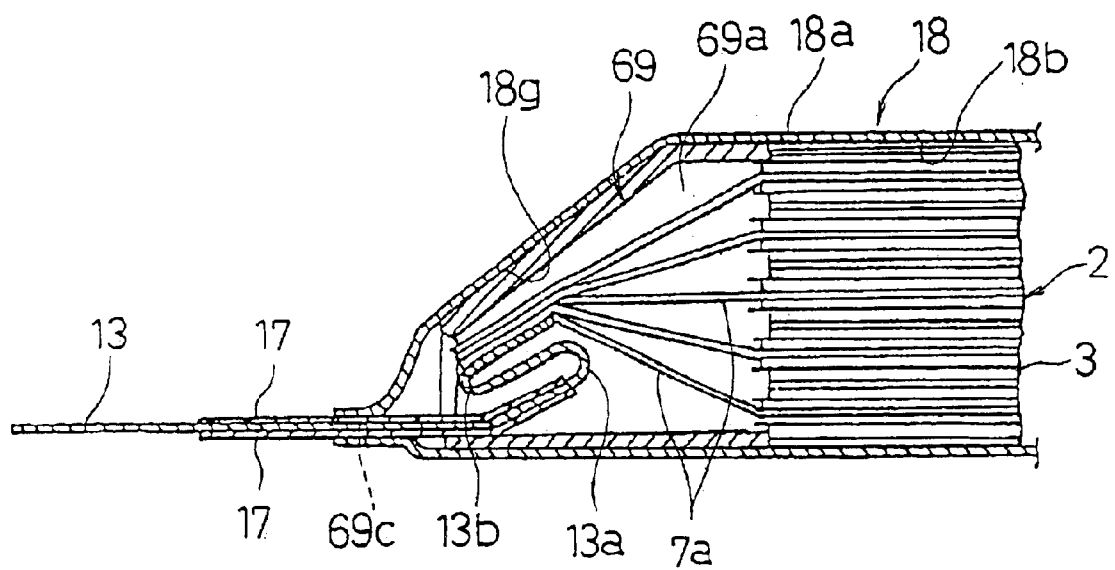
FIG. 22 is a cross-sectional view illustrating major parts of another modified example of the battery.

FIG. 22 is a cross-sectional view illustrating major parts of a battery, which is another modified example of the fourth embodiment. As is clear from a comparison between FIGS. 19 and 22, this battery is different from the one shown in FIG. 18A through FIG. 20 in that negative and positive electrode leads 13, 14 are folded twice within the insulating spacer 69. The negative electrode terminals 7a bundled together are joined to the tip of one of the two folded portions 13a, 13b of the negative electrode lead 13, the one, 13b being positioned nearer to the end of the battery. Although not shown, the positive electrode lead 14 is folded twice likewise.

Accordingly, apart from the effects mentioned above with respect to the battery shown in FIG. 18A through FIG. 20, this battery has the advantage of flexibility in negative and positive electrode leads 13, 14, which are provided with resiliency by the spring-like structure for absorbing tension which may possibly be applied to the leads from the outside of the casing 18. Therefore, unlike prior art batteries which were susceptible to even a slight external force, this battery withstands such and prevents breakage of electrode leads 13, 14.

Figure 23:
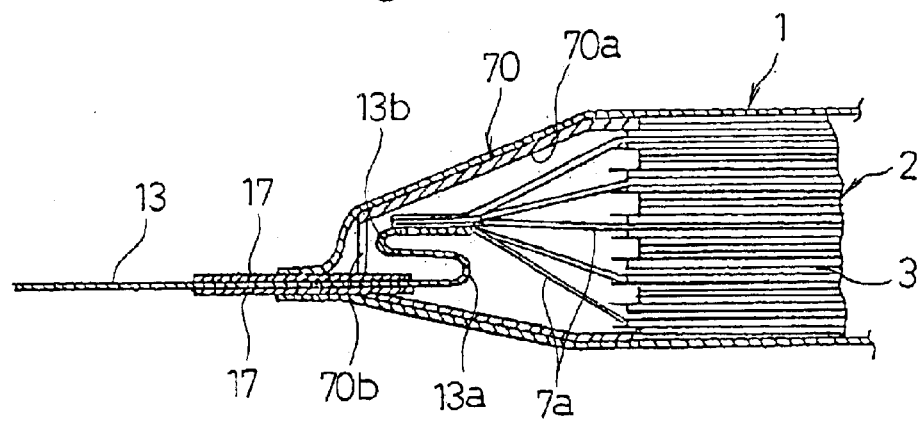
FIG. 23 is a cross-sectional view illustrating major parts of yet another modified example of the battery.

FIG. 23 is a cross-sectional view illustrating major parts of a battery, which is another modified example of the fourth embodiment. This battery employs a flexible bag-shaped laminate casing 1. The negative and positive electrode leads 13, 14 are bent twice within the insulating spacer 70. Accordingly, apart from the effects mentioned above with respect to the battery shown in FIGS. 21A and 21B, this battery has the advantage of flexibility in negative and positive electrode leads 13, 14, which are provided with resiliency by the spring-like structure for absorbing tension which may possibly be applied to the leads from the outside of the laminate casing 1. Therefore, unlike prior art batteries which were susceptible to even a slight external force, this battery withstands such and prevents breakage of electrode leads 13, 14. In the batteries shown in FIGS. 22 and 23, the insulating spacer 69 or 70 also functions as a protector for the bent portions 13a, 13b of the negative electrode lead 13 and those of the positive electrode lead 14.

Figure 24:
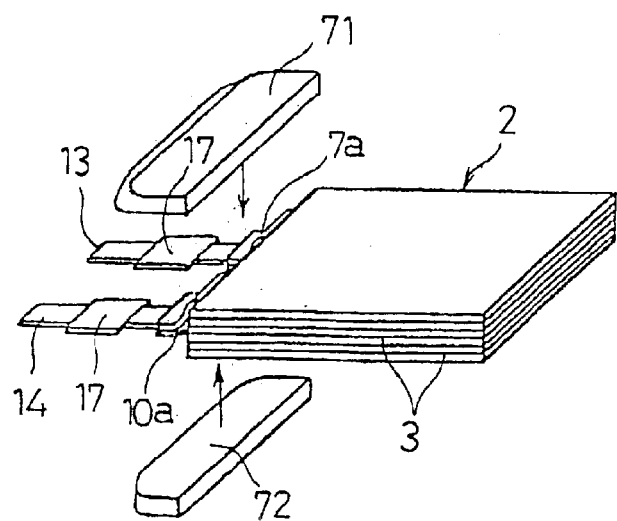
FIG. 24 is a perspective view prior to assembly illustrating a further modified example of the battery.

FIG. 24 shows a further modified example of the fourth embodiment. This battery is provided with a pair of flat spacers 71, 72 as a means for retaining electrode assembly instead of the one-piece insulating spacer 69 or 70. The flat spacers 71, 72 are made of a material which is resistant to the electrolyte and has flexibility. The opposite corners on one side of the spacers 71, 72 are rounded, while the other sides are straight, so that they make contact with the end face of the electrode assembly 2. The two pieces of flexible spacers 71, 72 are bonded together, covering the negative and positive electrode terminals 7a, 10a interposed therebetween. When accommodated within the casing 18, the spacers 71, 72 joined together function substantially the same as the insulating spacer 69 or 70 described above, holding the electrode assembly 2 fixedly in position. The spacers 71, 72, or electrode fixing means, need only be formed in flat shape and can be fabricated at low cost, while offering the same advantages as those of the insulating spacers 69 or 70.

Figure 25:
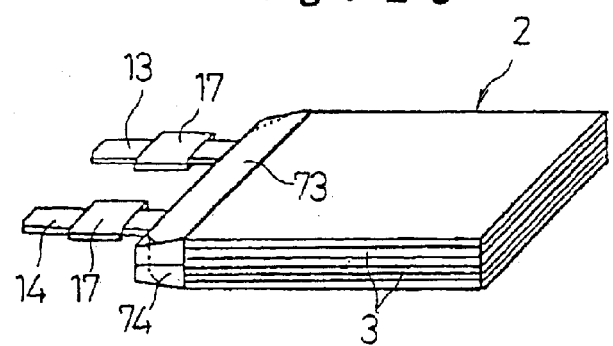
FIG. 25 is a perspective view prior to assembly illustrating a yet another modified example of the battery.

The spacers can also be formed initially in rectangular shape as shown in FIG. 25. The pair of spacers 73, 74 shown in the drawing are almost the same as those shown in FIG. 24, but are initially formed rectangular and trimmed to have rounded corners on one side as indicated by two dot lines after being joined together. These spacers 73, 74, or electrode fixing means, while offering the same advantages as the spacers shown in FIG. 24, can more readily be positioned with respect to each other when being joined together.

Figure 26A:
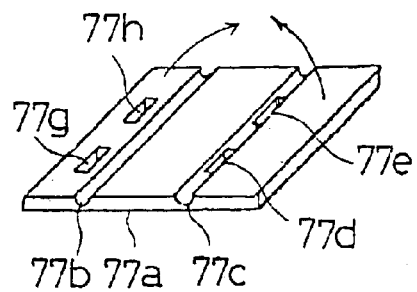
FIG. 26A and FIG. 26B are perspective views of a modified example of an insulating spacer in the above embodiment, respectively illustrating condition prior to assembly and after assembly.
Figure 26B:
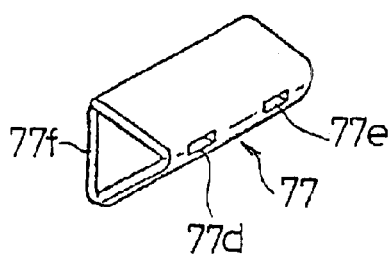

FIGS. 26A, 26B and FIGS. 27A, 27B respectively illustrate further modified examples of the fourth embodiment, which employ insulating spacers 77, 78 as a means for retaining the electrode assembly, which can be manufactured at low cost as compared to the spacer 69 or 70 described above. The spacer 77 shown in FIGS. 26A, 26B is made of a polypropylene flat plate 77a as shown in FIG. 26A having a thickness of about 0.1 mm to 0.5 mm. The flat plate 77a has grooves 77b, 77c formed therein for allowing it to be bent in directions of the arrows into the shape shown in FIG. 26B similar to the insulating spacer 69 or 70 described in the foregoing.

The spacer 77 thus has a shape, of which cross-section is substantially triangular, corresponding to the space formed by one end face of the electrode assembly 2 encased within the casing 18 and inner faces of the casing 18. The spacer 77 also has a pair of slits 77d, 77e for letting the negative and positive electrode leads 13, 14 extend to the outside, and a reinforcing portion 77f which will tightly abut the end face of the electrode assembly 2. Further, the triangularly prismatic spacer 77 has a pair of apertures 77g, 77h in one face thereof for passing the negative and positive electrode terminals 7a, 10a. As compared to the one-piece insulating spacer 69 or 70 described in the foregoing, the spacers 77 can be fabricated as flat plates 77a at low material cost.

Figure 27A:
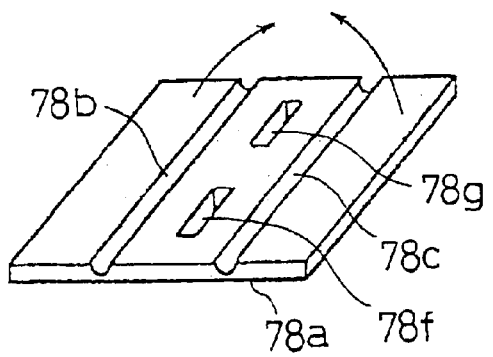
FIG. 27A and FIG. 27B are perspective views of another modified example of an insulating spacer in the above embodiment, respectively illustrating condition prior to assembly and after assembly.
Figure 27B:
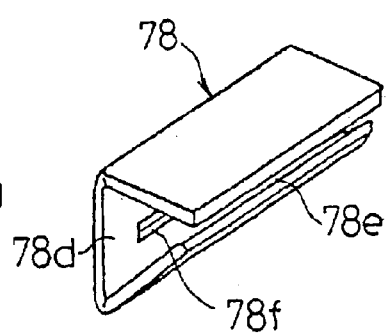

The insulating spacer 78 shown in FIGS. 27A, 27B is made of a flat plate 78a similarly to the spacer 77 shown in FIGS. 26A, 26B. The flat plate 78a has grooves 78b, 78c along which it is bent in directions of the arrows into a shape similar to the insulating spacer 69 or 70 described above, as can be seen from FIG. 27B.

The spacer 78 thus has a shape, of which cross-section is substantially triangular, corresponding to the space formed by one end face of the electrode assembly 2 encased within the casing 18 and inner faces of the casing 18. The portion between the grooves 78b, 78c serves as a reinforcing portion 78d which will tightly abut the end face of the electrode assembly 2. The negative and positive electrode leads 13, 14 are passed through the gap 78e between the opposite sides of the flat plate 78a. The spacer 78 also has a pair of apertures 78f, 78g in the reinforcing portion 78d for passing the negative and positive electrode terminals 7a, 10a.

As compared to the one-piece insulating spacer 69 or 70 described in the foregoing, the spacers 78 can be fabricated as flat plates 78a at low material cost. Moreover, the spacer 78 has an even simpler shape than the spacer 77, its gap 78e readily allowing the leads 13, 14 to be extended to the outside.

(Fifth Embodiment)

Figure 28:
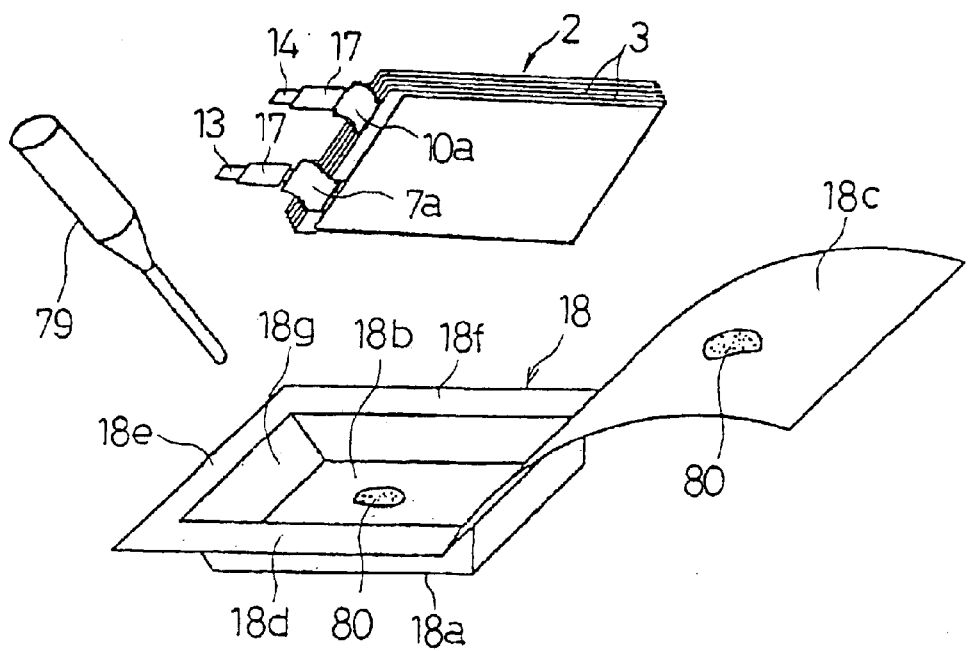
FIG. 28 is a perspective view prior to assembly illustrating a battery with a laminate casing according to a fifth embodiment of the present invention.
Figure 29:
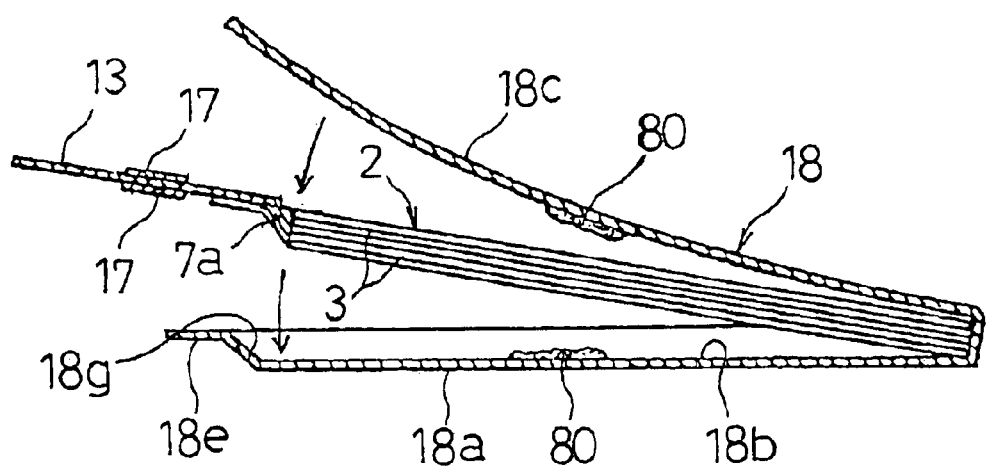
FIG. 29 is a cross-sectional view in the assembly step of the battery.

FIG. 28 is a perspective view showing a battery being assembled according to a fifth embodiment of the present invention. FIG. 29 is a cross-sectional view of the same. The battery employs the casing 18 shown in FIG. 39 and the electrode assembly 2. Before accommodating the electrode assembly 2 within the casing 18, drops of liquid metamorphic olefin resin 80 are applied to part of the bottom of the recess 18b and to the inner face of the cover 18c with a syringe 79 as shown in FIG. 28.

The electrode assembly 2 is then inserted into the recess 18b of the casing 18 as shown in FIG. 29, and the cover 18c is closed to contact the base part 18a. The seal flanges 18d, 18f along the opposite sides of the base part 18a and the peripheries of the cover 18c are joined by applying heat and pressure. Thereafter, hot plates are contacted locally to the base part 18a and the cover 18c at positions where the metamorphic olefin resin 80 has been applied, so that the resin 80 and the inside resin layer of the base part 18a and the cover 18c melt together. The metamorphic olefin resin 80, which is a thermosetting resin, sets as time passes, joining the outer surfaces of the electrode assembly 2 and the bottom of the recess 18b and the inner face of the cover 18c, respectively. Electrolyte is then injected and the casing 18 is sealed in a known manner.

For the metamorphic olefin resin 80, metamorphic polypropylene or metamorphic polyethylene is preferable. The metamorphic olefin resin 80 may be applied to the outer sides of the electrode assembly 2 instead of on the inner sides of the casing 18. Although the resin is applied at two locations in the example, it is preferable to apply two drops each of the resin at two locations on both sides. For the means for applying heat locally to the resin 80, high frequency or ultrasound may be used instead of the hot plates mentioned above.

The battery according to this embodiment has a very simple construction and is obtained at low cost, wherein the electrode assembly 2 is directly bonded to the casing 18. In addition to the effects described above, the battery has the advantage that changes in the number or the size of the electrode plates 4, 9 will not have direct bearing on the process for assembling the battery. It should be noted that, this embodiment applies also to the case where the bag-shaped flexible laminate casing 1 is used. The electrode assembly 2 can directly be bonded to the casing 1 by the same means as described above.

(Sixth Embodiment)

Figure 30:
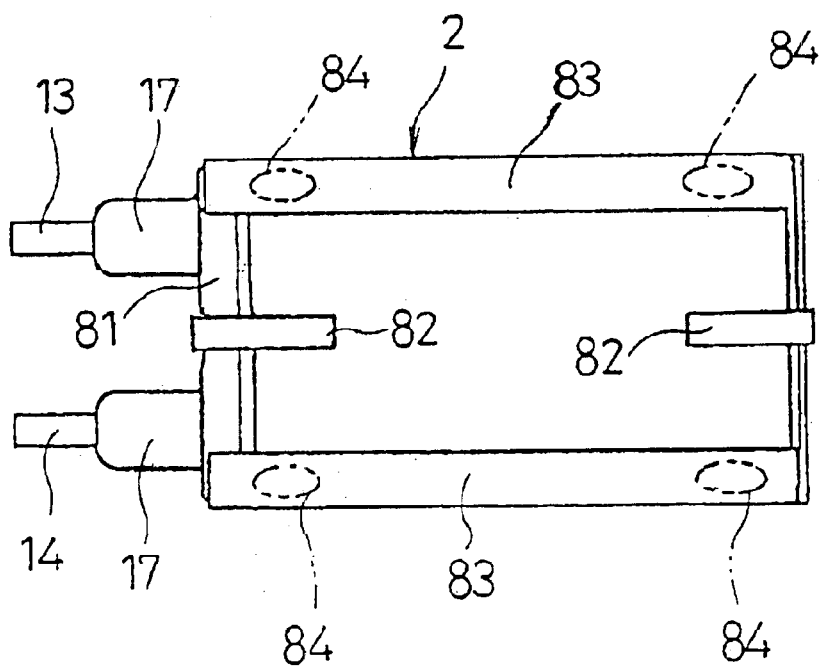
FIG. 30 is a plan view illustrating an electrode assembly of a battery with a laminate casing according to a sixth embodiment of the present invention.
Figure 31:
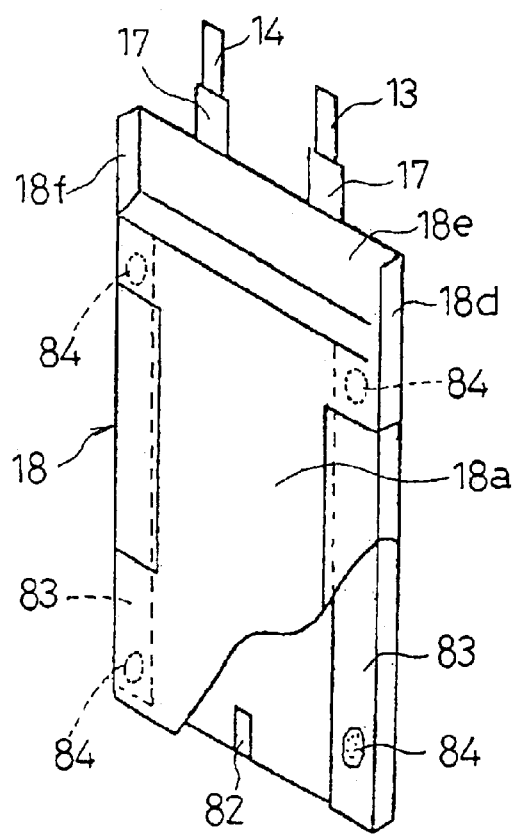
FIG. 31 is a partially broken perspective view illustrating the battery.

FIG. 30 is a plan view showing the electrode assembly 2 of a battery according to a sixth embodiment of the present invention. FIG. 31 is a partially broken perspective view of the assembled battery. The electrode assembly 2 is provided with an insulating member 81 along one side where the leads 13, 14 extend, such as to cover the burrs on the positive and negative electrode terminals 10a, 7a. Strips of tape 82 are attached to the electrode assembly 2 so that the plurality of stacked electrode plate modules 3 are temporarily fixed together. Further, a pair of side tapes 83 are attached to the opposite sides along the length of the electrode assembly 2 for covering the burrs on the electrode plates 4, 9 and for protecting same. Such tapes are commonly used in prior art.

The battery of this embodiment utilizes this known construction of electrode assembly, using the side tape 83 which is generally made of metamorphic polypropylene having a low melting point, to cause the side tapes 83 to melt with the inner resin layer of the casing 18. That is, after accommodating the electrode assembly 2 within the casing 18 with the cover 18c being closed onto the base part 18a, and after joining the seal flanges 18d, 18f on both sides of the base part 18a with the peripheries of the cover 18c, heat plates are contacted locally onto the casing 18 at four locations 84 where the side tapes 83 exist. Thus there are formed four molten spots 84 in the side tapes 83 as shown in FIG. 31.

In this way, the battery of this embodiment uses the known side tapes 83 as an adhesive to achieve a very simple construction and a reduction in cost, while ensuring that the electrode assembly 2 is directly bonded to and fixed to the casing 18 via the side tape 83. Therefore, in addition to the effects described above, the battery has the advantage that changes in the number or the size of the electrode plates 4, 9 will not have direct bearing on the process for assembling the battery.

Instead of the side tape 83, the tape 82 for holding the electrode plates together may also be utilized, because it is commonly made of the same resin as that for the side tape. For the means for applying heat locally to the side tape 83 or tape 82 in order to join the electrode assembly 2 with the casing 18, high frequency or ultrasound may be used instead of the hot plates mentioned above. It should be noted that, this embodiment applies also to the case where the bag-shaped flexible laminate casing 1 is used. The electrode assembly 2 can directly be bonded to the casing 1 by the same means as described above.

(Seventh Embodiment)

Figure 32:
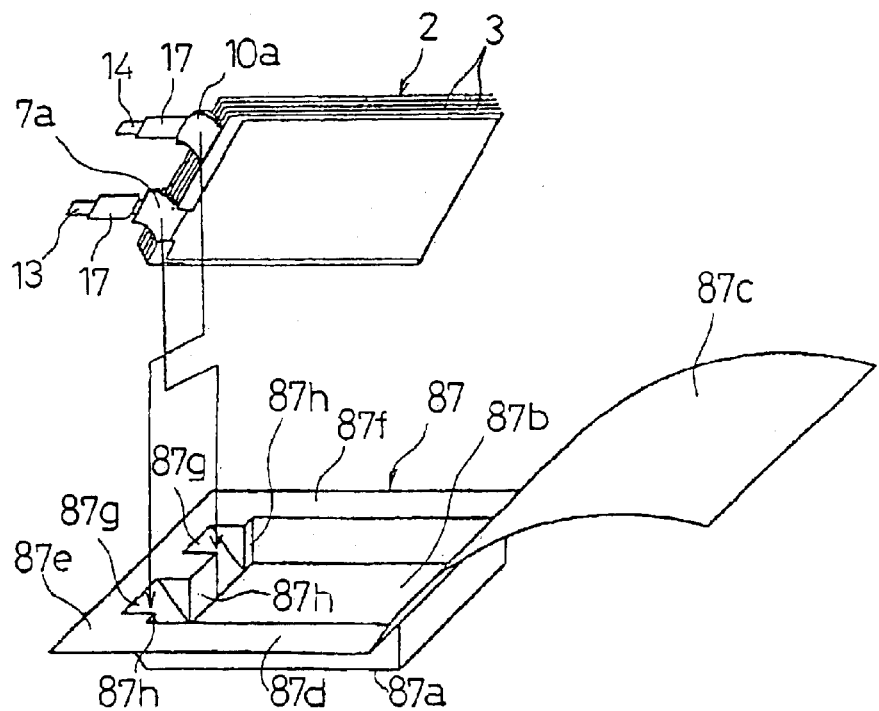
FIG. 32 is a perspective view illustrating a battery with laminate casing prior to assembly according to a seventh embodiment of the present invention.

FIG. 32 is a perspective view illustrating a battery according to a seventh embodiment of the present invention, before being assembled. The battery adopts an existing electrode assembly 2, but its casing 87 includes, in addition to the base part 87a, recess 87b, cover 87c, seal flanges 87d to 87f, and inclined surface 87g, abutment surfaces 87h formed in the inclined surface 87g perpendicularly to the bottom of the recess 87b at three locations between and on the outer sides of the electrode leads 13, 14.

When the electrode assembly 2 is inserted into the recess 87b with its leads 13, 14 facing the inclined surface 87g, the abutment surfaces 87h make tight contact with the end face of the electrode assembly 2 where the leads 13, 14 extend. Thus, the electrode assembly 2 stays in position within the recess 87b simply by being inserted thereinto. Therefore, in addition to the effects achieved by fixing of the electrode assembly described above, the battery has the advantage that no particular process is required for fixing the electrode assembly 2 such as applying heat with hot plates.

(Eighth Embodiment)

Figure 33:
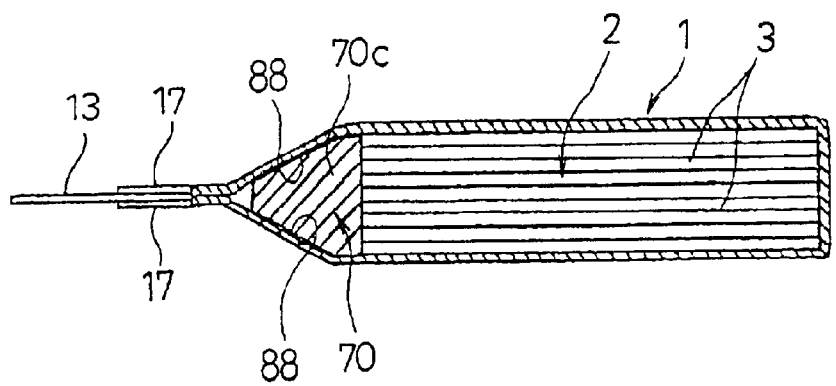
FIG. 33 is a longitudinal cross-sectional view illustrating a battery with laminate casing according to an eighth embodiment of the present invention.

FIG. 33 is a longitudinal cross-sectional view showing a battery according to an eight embodiment of the present invention. The battery employs an insulating spacer 70 as a means for retaining the electrode assembly and a flexible laminate casing 1. After accommodating the electrode assembly 2 within the casing 1, heat of about 150 to 300° C. and pressure of about 0.2 N/mm² to 2 N/mm² are applied to the battery for 0.5 to 10 sec to bond the inner resin layer of the casing 1, which has a lower melting point than the outer layer thereof, with the contacting portion 88 of the spacer 70. As compared to the side tape 83 joined to the casing 18 in the fifth embodiment, the insulating spacer 70 having much higher rigidity than the side tape 83 can more reliably retain the electrode assembly 2 in position. It should be noted that the insulating spacer 69 shown in FIGS. 19 and 22 can likewise be joined to the casing 18 by applying heat and pressure.

(Ninth Embodiment)

Figure 34:
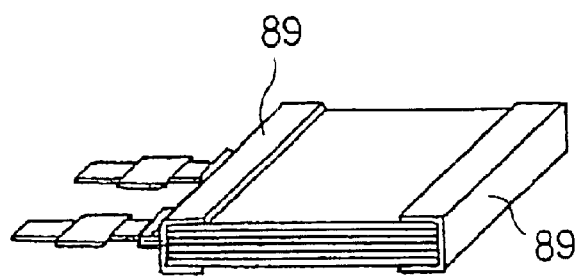
FIG. 34 is a perspective view illustrating a battery with a laminate casing prior to accommodation into the casing according to a ninth embodiment of the present invention.
Figure 35:
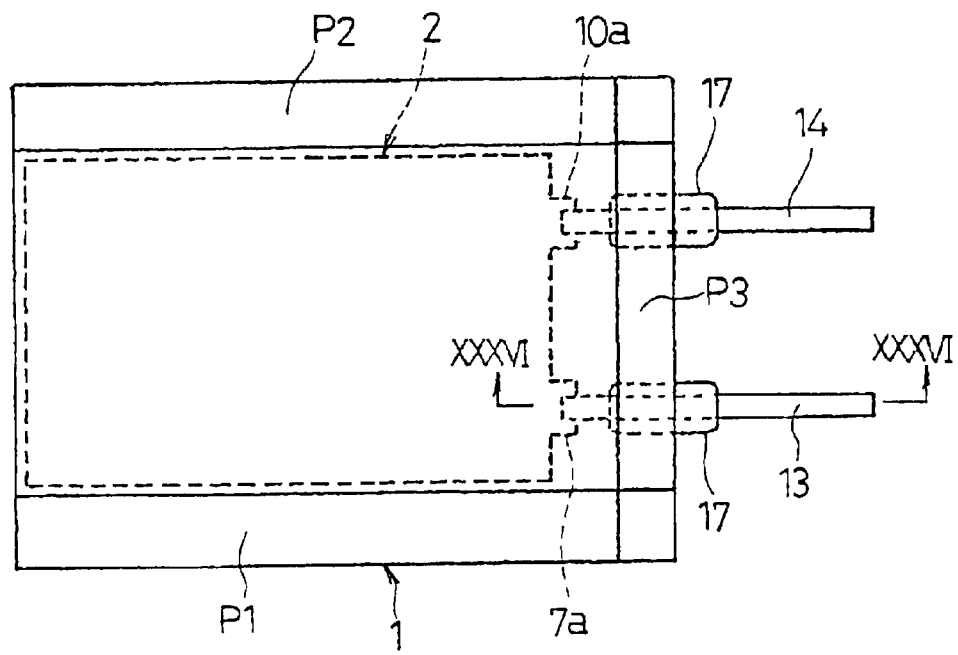
FIG. 35 is a plan view illustrating a prior art battery with a laminate casing.

FIG. 34 is a perspective view showing a battery according to a ninth embodiment of the present invention, before being accommodated within a casing 1 or 18. The battery employs two pieces of fixing sheet 89 which is either adhesive tape or heat-sensitive tape attached to the opposite ends of the electrode assembly 2. The tape 89 is bonded to the electrode assembly either by any bonding means or heat/pressure application means, and joined to the casing 1, 18, or 87 by applying heat and pressure. Similarly to the sixth embodiment, the electrode assembly 2 is directly bonded to the casing 1, 18, or 87 via the tape 89 and is retained in position with a simple and low-cost construction. Therefore, in addition to the effects described above, the battery has the advantage that changes in the number or the size of the electrode plates 4, 9 will not have direct bearing on the process for assembling the battery. This embodiment is particularly suitable for fixing a larger size electrode assembly 2.

It should be noted that the present invention is applicable not only to the stacked electrode assembly 2 as has been described in the foregoing, but also to a coil-shaped electrode assembly in which positive and negative electrodes are wound around with an intervening separator and pressed into a flat shape.

INDUSTRIAL APPLICABILITY

As is evident from the above, the battery according to the present invention has an electrode assembly fixing means. Therefore, the electrode assembly is held in position even when the portable electronic device in which the battery is installed is subjected to frequent or repeated vibration or large impact. Therefore, the positive and negative leads bonded respectively to the positive and negative electrode plates will not be bent or disconnected, and there is no risk that flexible laminate casing is broken by pointed burrs of the stacked electrode plates, or that a short circuit is formed across the intermediate metal layer of the casing and the electrode plate. Thereby, risks of battery output failure, leakage of electrolyte, or corrosion of the metal layer in the casing are all prevented. Thus the present invention provides a thin, light-weight, and reliable battery.

What is claimed is:

1. A battery comprising, liquid electrolyte and an electrode assembly, both accommodated within a sealed casing made of a laminate sheet, the electrode assembly including a plurality of positive electrode plates and a plurality of negative electrode plates stacked upon one another with a plurality of intervening separators therebetween, the positive electrode plates having respective positive electrode terminals and a positive electrode lead joined to the positive electrode terminals, and the negative electrode plates having respective negative electrode terminals and a negative electrode lead joined to the negative electrode terminals, the positive electrode lead and the negative electrode lead being extended outside through an end of the casing; and a fixing means for fixing the electrode assembly in position within the casing.

2. The battery according to claim 1, wherein the electrode assembly fixing means is a frame surrounding a periphery of the electrode assembly and accommodated within the casing with the electrode assembly, the frame including:

a rectangular frame portion surrounding the periphery of the electrode assembly, a pair of protective pieces projecting outwards from opposite side edges of one end of the frame portion to cover joints between the positive and negative electrode terminals and the positive and negative electrode leads on opposing sides thereof, the frame portion having through holes along one side thereof for allowing the positive and negative electrode terminals to extend to the outside.

3. The battery according to claim 2, wherein the frame includes a first part having a first half frame and a second part having a second half frame for holding the periphery of the electrode assembly on opposing sides, the first half frame and the second half frame being integral with each other via a bendable hinge and superposed upon one another, and respectively having a protective piece extending outwards from one end thereof opposite from the hinge, and one of the first half frame and the second half frame having notches therein for passing through the positive and negative electrode terminals to the outside.

4. The battery according to claim 3, wherein the first and the second half frames have engagement pieces for making locking engagement with each other on one end thereof opposite from the hinge.

5. The battery according to claim 2, wherein the protective pieces of the first and the second half frames come to face each other with a space formed therebetween and are connected via a connector when the first and the second half frames are superposed upon one another via the hinge.

6. The battery according to claim 2, wherein the frame includes a first part having a first half frame and a second part having a second half frame for holding the periphery of the electrode assembly on opposing sides thereof, the first half frame and the second half frame being separate from each other and respectively having a protective piece extending outwards from one end thereof, and engagement pieces along more than one side thereof for making looking engagement with each other to couple the first and the second parts when superposed, and one of the first half frame and the second half frame having notches therein for passing through the positive and negative electrode terminals to the outside.

7. The battery according to claim 1, wherein the electrode assembly fixing means is a frame surrounding the periphery of the electrode assembly and accommodated within the casing with the electrode assembly, the frame including:
an abutment portion making contact with one end face of the electrode assembly from which the positive and negative electrode terminals extend, the abutment portion being formed with through holes for passing through the positive and negative electrode terminals,
a pair of legs extending from both ends of the abutment portion to cover both side faces of the electrode assembly, and
a pair of protective pieces extending from opposite side edges of the abutment portion in a direction opposite from the pair of legs so as to cover joints between the positive and negative electrode terminals and their respective leads from both sides.

8. The battery according to claim 7, wherein the pair of protective pieces have a length extending to a portion near a joint between the positive and the negative electrode leads and the casing.

9. The battery according to claim 7, wherein the pair of protective pieces have resiliency so as to bend inwards when pressed by the laminate sheet forming the casing which is superposed and joined together at its periphery.

10. The battery according to claim 7, wherein the frame includes a cover integral with the frame extending from opposite side edges of the abutment portion in a direction opposite from the pair of legs so as to form a space therein having a triangular cross-section so as to accommodate the joints between the positive and negative electrode terminals and their respective leads within the space, the cover including through holes for passing through the positive and negative electrode terminals.

11. The battery according to claim 7, wherein the pair of legs has a U-shaped cross-section so as to fit onto the side edges of the electrode assembly.

12. The battery according to claim 11, wherein the frame further includes a pair of support frames integrally formed with the pair of legs, the support frames extending respectively from the distal ends of the legs inwards so as to cover the two corners of the electrode assembly at the end opposite from the end where the positive and negative electrode terminals extend.

13. The battery according to claim 7, wherein the frame further includes a pair of connector plates for closing the distal ends of the pair of legs so as to cover the two corners of the electrode assembly at the end opposite from the end where the positive and negative electrode terminals extend.

14. The battery according to claim 1, wherein the electrode assembly fixing means is an insulating spacer abutted on one end face of the rectangular electrode assembly where the positive and negative electrode terminals extend, and an adhesive tape for fixing the insulating spacer to the electrode assembly, the insulating spacer including a bottom abutting on one end face of the electrode assembly except for the positive and negative electrode terminals, a pair of side walls standing upright from both side edges of the bottom to a height for covering joints between the positive and negative electrode terminals and the positive and negative electrode leads, the bottom and the side walls being formed in one piece, and the adhesive tape being stuck over to the electrode assembly and the insulating spacer so as to cover four corners at one end of the electrode assembly.

15. The battery according to claim 14, further including an additional adhesive tape adhered to the opposite end of the electrode assembly so as to cover the four corners thereof.

16. The battery according to claim 14, wherein the electrode assembly includes a plurality of stacked electrode plate modules, each of the electrode plate modules including a negative electrode plate, a pair of positive electrode plates superposed on both sides of the negative electrode plate with intervening separators therebetween, and positive electrode terminals respectively extending from the pair of positive electrode plates, and wherein the positive electrode terminals are provided with an insulative coating at least on one side thereof facing an adjacent electrode plate module.

17. The battery according to claim 1, wherein the electrode assembly fixing means is an insulating spacer abutted on one end face of the rectangular electrode assembly where the positive and negative electrode terminals extend, and strips of adhesive tapes for fixing the insulating spacer to the electrode assembly, the insulating spacer including a bottom abutting on one end face of the electrode assembly except for the positive and negative electrode terminals, a pair of side walls standing upright from both side edges of the bottom to a height for covering joints between the positive and negative electrode terminals and the positive and negative electrode leads, the bottom and the side walls being formed in one piece, and the strips of adhesive tapes having a length for covering opposite side edges of the electrode assembly along the length thereof.

18. The battery according to claim 17, wherein one end face and both side end faces of the electrode assembly are trimmed to have flat surfaces.

19. The battery according to claim 1, wherein the electrode assembly fixing means is an insulating spacer made of a material resistant to the electrolyte and having a higher melting point than that of the casing, and accommodated within the casing together with the electrode assembly, the insulating spacer having a shape corresponding to a space defined by one end face of the electrode assembly where the positive and negative electrode terminals extend, and an inner surface of the casing opposite the end face of the electrode assembly, and including a pair of through holes for passing through the positive and the negative electrode leads respectively joined to the positive and the negative electrode terminals to the outside, and a reinforcing portion provided between the through holes such as to make tight contact with the one end face of the electrode assembly.

20. The battery according to claim 19, wherein the insulating spacer is made of a flat plate member bent along at least two grooves into the shape corresponding to the space defined by one end face of the electrode assembly and the inner surface of the casing opposite the end face of the electrode assembly.

21. The battery according to claim 19, wherein the insulating spacer and the casing e are joined together by applying heat and pressure.

22. The battery according to claim 19, wherein the positive and negative electrode leads are respectively provided with folded-back portions inside the insulating spacer near a point where the positive and negative electrode terminals are joined thereto.

23. The battery according to claim 1, wherein the electrode assembly fixing means is made of a pair of flat plate spacers made of a material resistant to the electrolyte and having resiliency, and accommodated within the casing together with the electrode assembly, the flat plate spacers being joined together such as to cover joints between the positive and negative electrode terminals of the electrode assembly as being deformed to conform to the contour of the joints, one end face of each of the flat plate spacers making contact with one end face of the electrode assembly where the positive and negative electrode terminals extend.

24. The battery according to claim 1, wherein the electrode assembly fixing means is a metamorphic olefin resin provided at a plurality of locations between the casing and the electrode assembly accommodated therein, the casing and the electrode assembly being joined together through the metamorphic olefin resin by applying heat and pressure.

25. The battery according to claim 1, wherein the electrode assembly fixing means is a tape attached to the electrode assembly for maintaining the shape thereof, the casing and the electrode assembly being joined together through the tape by applying heat and pressure.

26. The battery according to claim 1, wherein the electrode assembly fixing means is composed of a pair of inclined surfaces formed in one side face of a recess formed in the casing for receiving the electrode assembly, and abutting surfaces provided between the inclined surfaces and on both outer sides thereof, for making tight contact with one end face of the electrode assembly accommodated in the recess, the positive and negative electrode terminals of the electrode assembly being respectively fitted onto the inclined surfaces.

27. The battery according to claim 1, wherein the separators have larger outer dimensions than those of the positive electrode plates and the negative electrode plates.

28. The battery according to claim 1, wherein the casing is made of a laminate sheet bent in two and formed into a bag shape by joining the periphery thereof.

29. The battery according to claim 1, wherein the casing is made of a laminate sheet bent in two, and having a base part forming a recess for receiving the electrode assembly and a cover for closing the recess.

30. The battery according to claim 1, wherein the positive electrode plates and the negative electrode plates are wound into a coil with intervening separators therebetween and pressed into a flat shape.

31. A battery comprising:
a liquid electrolyte and an electrode assembly;
a casing formed of laminate sheet;
said liquid electrolyte and said electrode assembly accommodated within said casing;
said electrode assembly including a plurality of positive electrode plates and a plurality of negative electrode plates stacked upon one another with a plurality of intervening separators therebetween, the positive electrode plates having respective positive electrode terminals and a positive electrode lead joined to the positive electrode terminals, and the negative electrode plates having respective negative electrode terminals and a negative electrode lead joined to the negative electrode terminals, said positive electrode lead and said negative electrode lead extending through an end of the casing; and
an electrode assembly fixing structure including:
a first substantially planar region;
said first substantially planar region having three edge regions extending transversely to said first substantially planar region;
a second substantially planar region;
said second substantially planar region having three edge regions extending transversely to said second substantially planar region; and
said first substantially planar region being joined to said second substantially planar region.

32. The battery according to claim 31, further comprising:
said electrode assembly fixing structure being a frame surrounding a periphery of the electrode assembly and accommodated within the casing,
the frame including:
a pair of protective pieces projecting outwards from opposite side edges of one end of the frame portion to cover joints between the positive and negative electrode terminals and the positive and negative electrode leads; and
the frame portion having through holes along one side thereof for allowing the positive and negative electrode terminals to extend through said through holes.

33. The battery according to claim 32, further comprising:
said frame including a bendable hinge for joining at least one respective edge region of said first substantially planar region to at least one edge region of said second substantially planar region;
a protective piece extending outwards from an end opposite from the hinge; and
said first substantially planar region and said second substantially planar region having notches through which the positive and negative electrode terminals pass to the outside.

34. The battery according to claim 33, further comprising said first substantially planar region and said second substantially planar region having engagement pieces for engaging the first substantially planar region and the second substantially planar region.

35. The battery according to claim 32, wherein said protective pieces face each other with a space formed therebetween and are connected via a connector.

36. The battery according to claim 31, further comprising an adhesive tape for joining the electrode assembly fixing structure to the electrode assembly.

37. The battery according to claim 36, further comprising an additional adhesive tape for covering at least one corner of said electrode assembly fixing structure.

38. The battery according to claim 36, further comprising said positive electrode terminals having an insulative coating on at least one side of said positive electrode terminals.

39. A battery comprising:
a liquid electrolyte and an electrode assembly;
a casing formed of laminate sheet;
said liquid electrolyte and said electrode assembly accommodated within said casing;
said electrode assembly including a plurality of positive electrode plates and a plurality of negative electrode plates stacked upon one another with a plurality of intervening separators therebetween, the positive electrode plates having respective positive electrode terminals and a positive electrode lead joined to the positive electrode terminals, and the negative electrode plates having respective negative electrode terminals and a negative electrode lead joined to the negative electrode terminals, said positive electrode lead and said negative electrode lead extending through an end of the casing; and an electrode assembly fixing structure including:
   a C-shaped member; and
   three pairs of edge regions extending transversely to the C-shaped member.

40. The battery according to claim 39, further comprising:

said electrode assembly fixing structure being a frame surrounding part of the periphery of the electrode assembly and accommodated within the casing;

the frame including a partially rectangular frame portion surrounding part of the periphery of the electrode assembly; and the frame having through holes along one side thereof for allowing the positive and negative electrode terminals to extend through said frame.

41. The battery according to claim 40, wherein the pair of protective pieces have resiliency so as to bend inwards when pressed by the laminate sheet forming the casing which is superposed and joined together at its periphery.

42. The battery according to claim 39, further comprising a pair of protective pieces.

43. The battery according to claim 39, further comprising an adhesive tape for joining the electrode assembly fixing structure to the electrode assembly.

44. The battery according to claim 43, further comprising said positive electrode terminals having an insulative coating on at least one side of said positive electrode terminals.

45. The battery according to claim 43, further comprising an additional adhesive tape for covering at least one corner of said electrode assembly fixing structure.

46. A battery comprising:

a liquid electrolyte and an electrode assembly;

a casing being laminate sheet;

said liquid electrolyte accommodated within a said casing;

said electrode assembly including a plurality of positive electrode plates and a plurality of negative electrode plates stacked upon one another with a plurality of intervening separators therebetween, the positive electrode plates having respective positive electrode terminals and a positive electrode lead joined to the positive electrode terminals, and the negative electrode plates having respective negative electrode terminals and a negative electrode lead joined to the negative electrode terminals, said positive electrode lead and said negative electrode lead being extending through one end of the casing; and an electrode assembly fixing structure including a U-shaped member for supporting said electrode assembly.

47. The battery according to claim 46, further comprising:

said electrode assembly structure being a frame partially surrounding the electrode assembly and accommodated within the casing; and said fame including a pair of protective pieces.

48. The battery according to claim 46, further comprising an adhesive tape for joining the electrode assembly fixing structure to the electrode assembly.

49. The battery according to claim 48, further comprising an additional adhesive tape for covering at least one corner of said electrode assembly fixing structure.

50. The battery according to claim 48, further comprising said positive electrode terminals having an insulative coating on at least one side of said positive electrode terminals.

* * * * *